(12) United States Patent
Tanigawa et al.

(10) Patent No.: US 9,235,216 B2
(45) Date of Patent: Jan. 12, 2016

(54) RUNNING INFORMATION GENERATING APPARATUS OF AUTONOMOUS RUNNING APPARATUS, RUNNING INFORMATION GENERATING METHOD, RUNNING INFORMATION GENERATING PROGRAM, AND AUTONOMOUS RUNNING APPARATUS

(71) Applicant: Panasonic Intellectual Property Management Co., Ltd., Osaka (JP)

(72) Inventors: Toru Tanigawa, Osaka (JP); Jun Ozawa, Nara (JP); Katsuyoshi Yamagami, Osaka (JP); Eiichi Naito, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/702,094

(22) Filed: May 1, 2015

(65) Prior Publication Data

US 2015/0234383 A1    Aug. 20, 2015

Related U.S. Application Data

(63) Continuation of application No. PCT/JP2013/006431, filed on Oct. 30, 2013.

(30) Foreign Application Priority Data

Nov. 5, 2012    (JP) ................................ 2012-243498

(51) Int. Cl.
*G01C 22/00*    (2006.01)
*G05D 1/02*    (2006.01)

(52) U.S. Cl.
CPC ............. *G05D 1/0246* (2013.01); *Y10S 901/01* (2013.01); *Y10S 901/47* (2013.01)

(58) Field of Classification Search
CPC .......... G05D 1/024; G05D 2201/0206; G05D 1/0246
USPC .............................................. 701/301, 23, 28
See application file for complete search history.

(56) References Cited

U.S. PATENT DOCUMENTS

2006/0018274 A1* 1/2006 Twitchell, Jr. ..... G06K 7/10108
370/328
2006/0184274 A1    8/2006 Sakai et al.
(Continued)

FOREIGN PATENT DOCUMENTS

JP    2004-178229    6/2004
JP    2004-280451    10/2004
(Continued)

OTHER PUBLICATIONS

International Search Report issued Jan. 28, 2014 in International (PCT) Application No. PCT/JP2013/006431.
(Continued)

*Primary Examiner* — Redhwan K Mawari
(74) *Attorney, Agent, or Firm* — Wenderoth, Lind & Ponack, L.L.P.

(57) ABSTRACT

A movement information calculator calculates a moving direction and a speed of the moving person from a position history database. An approach time calculator calculates an approach time at which an autonomous running apparatus and the moving person approach to each other within a predetermined distance from the moving person's position, moving direction, and speed, and the running information. A gaze position obtaining unit obtains a moving person's gaze position from the moving person's position and moving direction, and the position of an obstacle recorded in an obstacle database. A gaze region calculator calculates a moving person's gaze region from the moving person's position, moving direction, and gaze position. A running information generator generates running information for making the autonomous running apparatus run to the gaze region at a predetermined time earlier than the approach time from the obstacle's position, the approach time, and the gaze region.

19 Claims, 35 Drawing Sheets

(56) References Cited

U.S. PATENT DOCUMENTS

| | | | |
|---|---|---|---|
| 2008/0040040 A1 | 2/2008 | Goto et al. | |
| 2008/0221730 A1 | 9/2008 | Sakata et al. | |
| 2014/0039676 A1 | 2/2014 | Fernando et al. | |
| 2014/0148989 A1 | 5/2014 | Ueda et al. | |
| 2015/0234383 A1* | 8/2015 | Tanigawa | G05D 1/0246 701/28 |

FOREIGN PATENT DOCUMENTS

| | | |
|---|---|---|
| JP | 2007-229814 | 9/2007 |
| JP | 2008-065811 | 3/2008 |
| JP | 2008-246665 | 10/2008 |
| JP | 2008-260107 | 10/2008 |
| JP | 2009-285818 | 12/2009 |
| JP | 2011-110644 | 6/2011 |
| JP | 2013-225253 | 10/2013 |
| JP | 2014-002514 | 1/2014 |
| WO | 2013/011543 | 1/2013 |
| WO | 2013/069195 | 5/2013 |

OTHER PUBLICATIONS

"Service Level in the Pedestrian and Wheel Chair User Mixed Traffic and Eye Movement of Wheel Chair User" by Kazuhiro Kimura and Koshiro Shimizu, Infrastructure Planning and Management Review, pp. 769-774, No. 12, 1995.

"Planning and Navigation by a Mobile Robot in the Presence of Multiple Moving Obstacles and Their Velocities" by Takashi Tsubouchi, Tomohide Naniwa, Suguru Arimoto, Journal of Robotic Society of Japan, pp. 1029-1037, vol. 12, No. 7, 1994.

"Randomized Kinodynamic Plannmg" by Steven M. LaValle and James J. Kuffner, Robotics and Automation, 1999. Proceedings. 1999 IEEE International Conference on, pp. 473-479, vol. 1.

International Preliminary Report on Patentability and Written Opinion of the International Searching Authority mailed May 14, 2015 in International (PCT) Application No. PCT/JP2013/006431.

* cited by examiner

Fig.6

| TAG ID | TYPE |
|---|---|
| TAG_001 | ROBOT |
| TAG_002 | WHEEL_CHAIR |
| TAG_003 | HEALTHY_PERSON |
| ... | ... |

Fig.7

| TAG DETECTION TIME | MOVING OBJECT ID | MOVING OBJECT TYPE | MOVING OBJECT POSITION |
|---|---|---|---|
| ... | ... | ... | ... |
| 14:23:15.400 | TAG_001 | ROBOT | (0,150) |
| 14:23:15.400 | TAG_002 | WHEEL_CHAIR | (1000,200) |
| 14:23:15.500 | TAG_001 | ROBOT | (10,150) |
| 14:23:15.500 | TAG_002 | WHEEL_CHAIR | (990,200) |
| 14:23:15.600 | TAG_001 | ROBOT | (20,150) |
| 14:23:15.600 | TAG_002 | WHEEL_CHAIR | (980,200) |

Fig. 8A

|  | WALL 201w | WALL 201x | CHAIR 206A | CHAIR 206B | ⋮ |
|---|---|---|---|---|---|
| VERTEX 1 | (0,400,0) | (0,0,0) | (450,350,0) | (200,50,0) | ⋮ |
| VERTEX 2 | (1000,400,0) | (1000,0,0) | (600,350,0) | (350,50,0) | ⋮ |
| VERTEX 3 | (1000,350,0) | (1000,-50,0) | (600,300,0) | (350,0,0) | ⋮ |
| VERTEX 4 | (0,350,0) | (0,-50,0) | (450,300,0) | (200,0,0) | ⋮ |
| VERTEX 5 | (0,400,0) | (0,0,150) | (450,350,50) | (200,50,50) | ⋮ |
| VERTEX 6 | (1000,400,150) | (1000,0,150) | (600,350,50) | (350,50,50) | ⋮ |
| VERTEX 7 | (1000,350,150) | (1000,-50,150) | (600,300,50) | (350,0,50) | ⋮ |
| VERTEX 8 | (0,350,150) | (0,-50,150) | (450,300,50) | (200,0,50) | ⋮ |

Fig.8B

| GAZE POSITION | WALL 201w | WALL 201x | CHAIR 206A | | CHAIR 206B | | ... |
|---|---|---|---|---|---|---|---|
| | | | (600,300,0) | (450,300,0) | (200,50,0) | (350,50,0) | ... |
| CONDITION 1 | NONE | NONE | WHEELCHAIR USER MOVES FROM +x DIRECTION TO -x DIRECTION OR FACES -x DIRECTION AND STOPS. | WHEELCHAIR USER MOVES FROM -x DIRECTION TO +x DIRECTION OR FACES x DIRECTION AND STOPS. | WHEELCHAIR USER MOVES FROM -x DIRECTION TO +x DIRECTION OR FACES y DIRECTION AND STOPS. | WHEELCHAIR USER MOVES FROM +x DIRECTION TO -x DIRECTION OR FACES -y DIRECTION AND STOPS. | ... |
| CONDITION 2 | NONE | NONE | POSITION OF WHEELCHAIR USER IN x-AXIAL DIRECTION IS 600 cm OR MORE. | POSITION OF WHEELCHAIR USER IN x-AXIAL DIRECTION IS 450 cm OR LESS. | POSITION OF WHEELCHAIR USER IN x-AXIAL DIRECTION IS 300 cm OR LESS. | POSITION OF WHEELCHAIR USER IN x-AXIAL DIRECTION IS 450 cm OR MORE. | ... |

Fig. 8C

| | CHAIR 206A AND CHAIR 206B | | ... |
|---|---|---|---|
| GAZE POSITION | REGION(600,300,0)(350,50,0) | REGION(450,300,0)(200,50,0) | ... |
| CONDITION 1 | WHEELCHAIR USER MOVES FROM +x DIRECTION TO -x DIRECTION OR FACES -x DIRECTION AND STOPS. | WHEELCHAIR USER MOVES FROM -x DIRECTION TO +x DIRECTION OR FACES x DIRECTION AND STOPS. | ... |
| CONDITION 2 | POSITION OF WHEELCHAIR USER IN x-AXIAL DIRECTION IS 600 cm OR MORE. | POSITION OF WHEELCHAIR USER IN x-AXIAL DIRECTION IS 300 cm OR LESS. | ... |

Fig. 8D

| | DIRECTION BOARD 1 | DIRECTION BOARD 2 | ... |
|---|---|---|---|
| GAZE POSITION | REGION (200,300,100)(300,300,150) | REGION (700,0,100)(800,0,150) | ... |
| CONDITION 1 | POSITION OF WHEELCHAIR USER IS WITHIN 5 m FROM GAZE POSITION | POSITION OF WHEELCHAIR USER IS WITHIN 5 m FROM GAZE POSITION | ... |
| CONDITION 2 | DIAGNOSIS AND TREATMENT DEPARTMENT IS ORTHOPEDIC SURGERY. | DIAGNOSIS AND TREATMENT DEPARTMENT IS INTERNAL MEDICINE. | ... |

Fig. 8E

| | CHAIR 206A AND DIRECTION BOARD 1 | | ... |
|---|---|---|---|
| GAZE POSITION | REGION: POINT(600,300,0) REGION (200,300,100)(600,300,150) | REGION: POINT(450,300,0) REGION (200,300,100)(300,300,150) | ... |
| CONDITION 1 | WHEELCHAIR USER MOVES FROM +x DIRECTION TO -x DIRECTION OR FACES -x DIRECTION AND STOPS. | WHEELCHAIR USER MOVES FROM -x DIRECTION TO +x DIRECTION OR FACES +x DIRECTION AND STOPS. | ... |
| CONDITION 2 | POSITION OF WHEELCHAIR USER IN x-AXIAL DIRECTION IS 600 cm OR MORE. | POSITION OF WHEELCHAIR USER IN x-AXIAL DIRECTION IS 450 cm OR LESS. | ... |

Fig.9A

| SHAPE | LENGTH (cm) | 60 |
|---|---|---|
| | WIDTH (cm) | 60 |
| | HEIGHT (cm) | 100 |

Fig.9B

| | LENGTH (cm) | WIDTH (cm) | HEIGHT (cm) |
|---|---|---|---|
| TAG POSITION | 0 | 60 | 100 |

Fig.9C

| MAXIMUM SPEED | 100(cm/s) |
|---|---|
| MAXIMUM ACCELERATION (DECELERATION) SPEED | 100(cm/s$^2$) |
| MAXIMUM SWING SPEED | 30(deg/s) |
| MAXIMUM SWING ACCELERATION (DECELERATION) SPEED | 30(deg/s$^2$) |

Fig.9D

| | x(cm) | y(cm) | Θ(deg) |
|---|---|---|---|
| INITIAL POSITION | -1000 | 800 | 0 |
| RELAY POSITION 1 | -200 | 800 | -90 |
| RELAY POSITION 2 | -200 | 150 | 0 |
| DESIRED POSITION | 1000 | 150 | 0 |

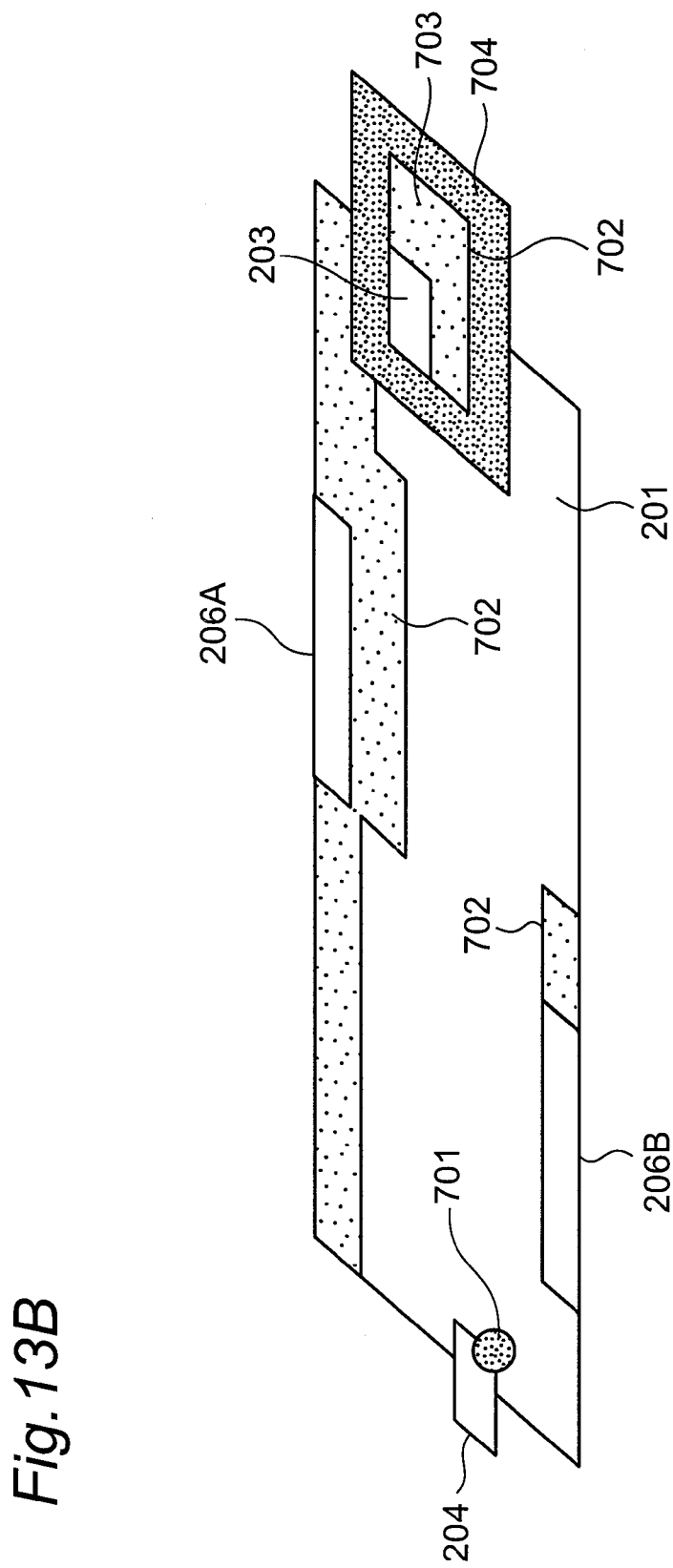

Fig.21

| TAG ID | PATIENT ID | DIAGNOSIS AND TREATMENT DEPARTMENT TO BE VISITED | TREATMENT CONTENTS |
|---|---|---|---|
| TAG_P0101 | P1223 | ORTHOPEDIC SURGERY | X-RAY |
| TAG_P0102 | P1431 | INTERNAL MEDICINE | INQUIRY |
| TAG_P0103 | P2312 | INTERNAL MEDICINE | PERIODIC MEDICAL CHECKUP |
| ... | ... | ... | ... |
| | | | |
| | | | |

Fig.22A

| DIAGNOSIS AND TREATMENT DEPARTMENT | BULLETIN BOARD | STANDARD POSITION | CHECK POSITION COORDINATES (REPRESENTATIVE COORDINATES) | SIZE |
|---|---|---|---|---|
| ORTHOPEDIC SURGERY | ORTHOPEDIC SURGERY (DISPLAY OF DIAGNOSIS AND TREATMENT DEPARTMENT) | (123,14,18) | (12,154,13) | 15 |
| | X-RAY ROOM | (123,14,18) | (32,88,2) | 10 |
| | ... | ... | ... | ... |
| INTERNAL MEDICINE | ... | ... | ... | ... |
| | | | | |
| | | | | |

Fig.25

| PATIENT ID | WHEELCHAIR USER USING HISTORY | WHEELCHAIR TYPE |
|---|---|---|
| P1223 | 2 YEARS AND 3 MONTHS | KX-010 |
| P1431 | 10 MONTHS | KL-002 |
| P2312 | 3 MONTHS | KA-001 |
| ... | ... | ... |
|  |  |  |
|  |  |  |

RUNNING INFORMATION GENERATING APPARATUS OF AUTONOMOUS RUNNING APPARATUS, RUNNING INFORMATION GENERATING METHOD, RUNNING INFORMATION GENERATING PROGRAM, AND AUTONOMOUS RUNNING APPARATUS

CROSS-REFERENCE TO RELATED APPLICATIONS

This is a continuation application of International Application No. PCT/JP2013/006431, with an international filing date of Oct. 30, 2013, which claims priority of Japanese Patent Application No.: 2012-243498 filed on Nov. 5, 2012, the content of which is incorporated herein by reference.

TECHNICAL FIELD

The technical field relates to a running information generating apparatus of an autonomous running apparatus, an autonomous running apparatus, a running information generating method of the autonomous running apparatus, and a running information generating program of the autonomous running apparatus each of which plans a route based on a result of identifying a type of a person in a space where people go by.

BACKGROUND ART

As a running control method of the autonomous running apparatus, there is a conventionally known technique for determining whether a person recognizes an autonomous running apparatus from how much a person faces a front with respect to the autonomous running apparatus and changing a movement of the autonomous running apparatus based on a determined result (see Patent Literature 1).

CITATION LIST

Patent Literature

Patent Literature 1: JP 2004-280451 A

SUMMARY OF THE INVENTION

In the above conventional technique, however, when a person is identified, discrimination is not made whether the person moves by foot or in a wheelchair, namely, a type of the person. For this reason, an autonomous running apparatus cannot run in view of a characteristic of a gaze position different depending on a type of a moving person.

One non-limiting and exemplary embodiment provides a running information generating apparatus of an autonomous running apparatus, the autonomous running apparatus, a running information generating method of the autonomous running apparatus, and a running information generating program of the autonomous running apparatus, for controlling running of the autonomous running apparatus based on the gaze characteristic in accordance with a type of a moving person so as to make the moving person recognize presence of the autonomous running apparatus more securely in order to allow the autonomous running apparatus to run more safely.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A running information generating apparatus of an autonomous running apparatus comprising:

a position obtaining unit that obtains a position of a moving person in a building with the position being related to every predetermined time or an amount of time;

a moving person identifying unit that identifies a type of the moving person obtained from the position obtaining unit;

a position history database that records, in chronological order, the position and the type of the moving person obtained by the position obtaining unit and the moving person identifying unit, respectively;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;

an environment database that records a position of a still object present in the building together with information about the moving person who tends to gaze at the still object;

a gaze position obtaining unit that obtains a gaze position of the moving person based on the position and the type of the moving person, the moving direction of the moving person, and the position of the still object;

a gaze region calculator that calculates a gaze region of the moving person based on the position and the type of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the still object, the approach time, and the gaze region.

These general and specific aspects may be implemented using a system, a method, and a computer program, and any combination of systems, methods, and computer programs.

According to the aspect of the present disclosure, the running information generating apparatus can generate running information that enables the moving person to recognize the presence of the autonomous running apparatus more securely, and the autonomous running apparatus to run suitably in accordance with the type of the moving person.

BRIEF DESCRIPTION OF THE DRAWINGS

These and other aspects and features of the present disclosure will become clear from the following description taken in conjunction with the embodiments thereof with reference to the accompanying drawings, in which:

FIG. 6 is a view illustrating one example of information recorded in a tag;

FIG. 7 is a view illustrating one example of a position history database;

FIG. 8A is a view illustrating one example of obstacle information of an environment database according to the first embodiment;

FIG. 8B is a view illustrating one example of gaze position information 1 of the environment database according to the first embodiment;

FIG. 8C is a view illustrating one example of gaze position information 2 of the environment database according to the first embodiment;

FIG. 8D is a view illustrating one example of gaze position information 3 of the environment database according to the first embodiment;

FIG. 8E is a view illustrating one example of gaze position information 4 of the environment database according to the first embodiment;

FIG. 9A is a view illustrating one example of shape information in an autonomous running apparatus database;

FIG. 9B is a view illustrating one example of tag position information of the autonomous running apparatus database;

FIG. 9C is a view illustrating one example of speed information in the autonomous running apparatus database;

FIG. 9D is a view illustrating one example of moving route information in the autonomous running apparatus database;

FIG. 13B is a view after creation of a configuration illustrating one example of a configuration space;

FIG. 21 is a view illustrating one example of a patient information storage according to the second embodiment;

FIG. 22A is a view illustrating one example of the environment database according to the second embodiment;

FIG. 25 is a view illustrating one example of a patient information storage according to the third embodiment;

DETAILED DESCRIPTION (Knowledge that is the Basis of the Present Disclosure)

Figure 1:
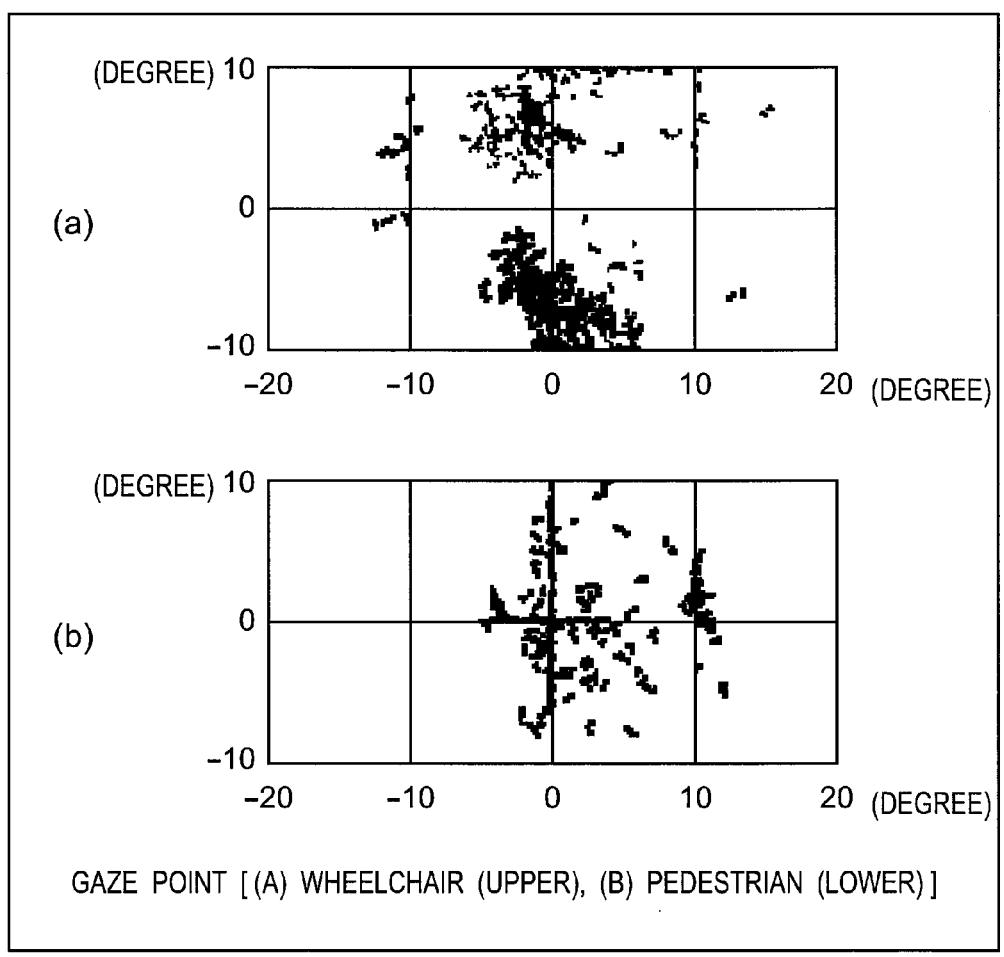
FIG. 1 is an explanatory view illustrating differences in positions of gaze points between a normal pedestrian and a wheelchair user.

For example, it is known that a moving person in a wheelchair gazes at an obstacle at his/her feet more frequently than a moving person who normally walks (hereinafter, "normal pedestrian"), and has less composure to check both right and left sides (Non-Patent Literature 1: "Service Level in the Pedestrian and Wheel Chair User Mixed Traffic and Eye Movement of Wheel Chair User" by Kazuhiro Kimura and Koshiro Shimizu, Infrastructure Planning and Management Review No. 12, 1995). FIG. 1 is a view illustrating differences in gaze positions between a wheelchair user and a normal pedestrian of the above literature. The normal pedestrian shown on a lower side (b) in FIG. 1 checks all around his/her environment evenly. On the other hand, the wheelchair user shown on an upper side (a) in FIG. 1 gazes at a forward direction and a road surface for checking more frequently.

Figure 2:
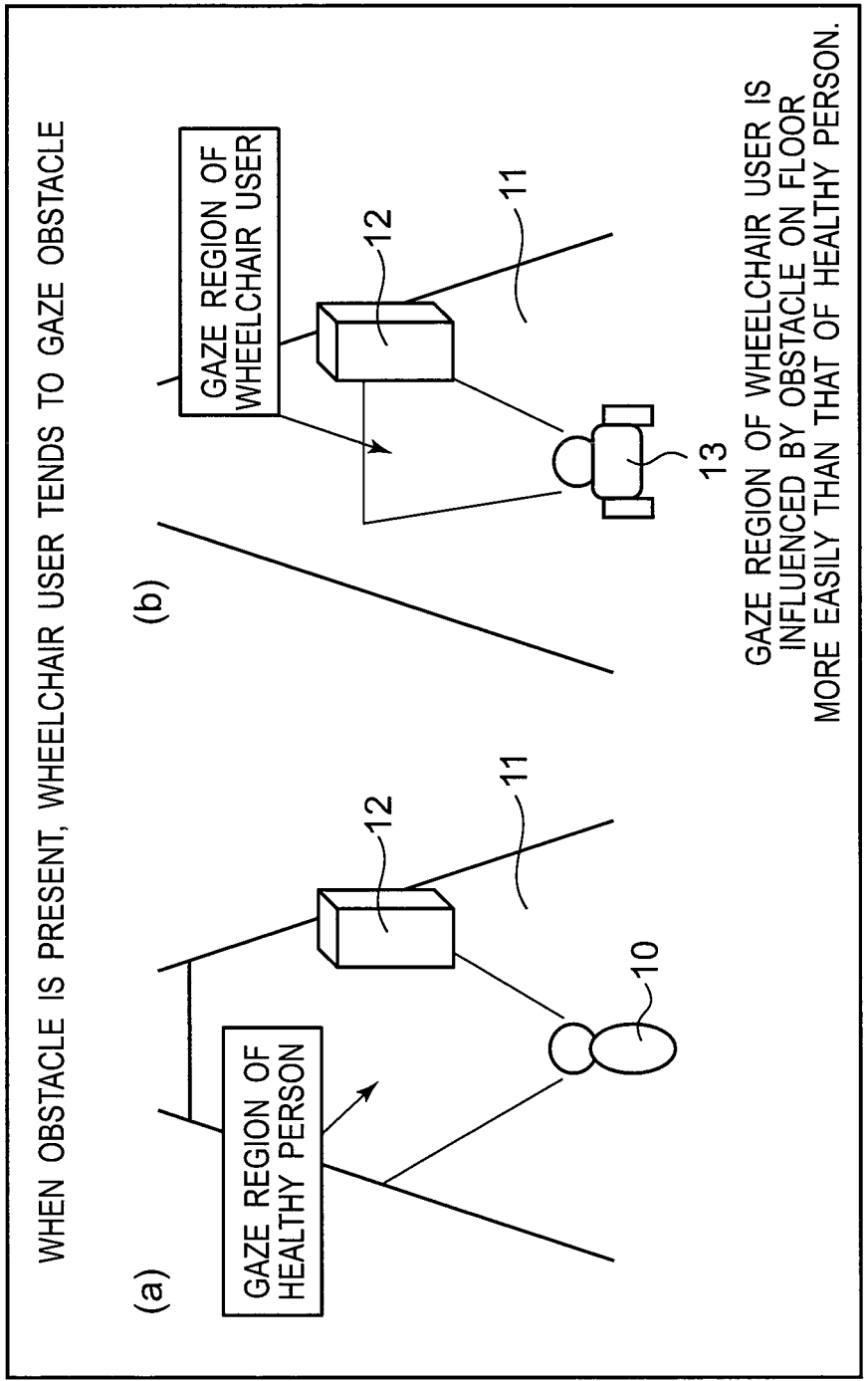
FIG. 2 is an explanatory view illustrating differences in gaze regions between the wheelchair user and the normal pedestrian.

FIG. 2 illustrates differences in gaze regions between the normal pedestrian and the wheelchair user when obstacles such as chairs and lockers are present on a hallway in a building such as a hospital. As shown on a left part (a) of FIG. 2, a gaze region of a normal pedestrian 10 is an entire hallway even when an obstacle 12 such as a chair or a locker is present on a hallway (floor) 11. On the other hand, a wheelchair user 13 gazes at not the entire hallway but the obstacle 12 when the obstacle 12 such as a chair is present close to the wall of the hallway 11. Therefore, the wheelchair user 13 is influenced by the gaze region with respect to the obstacle 12 close to the wall the hallway 11 more easily than the normal pedestrian 10.

As a result, in a case where a person who faces an autonomous running apparatus 14 is the wheelchair user 13, even when the wheelchair user 13 has a high probability of facing the autonomous running apparatus 14, the wheelchair user 13 is likely not to be aware of the autonomous running apparatus 14 because of gazing at the obstacle 12 on the hallway 11.

Figure 3:
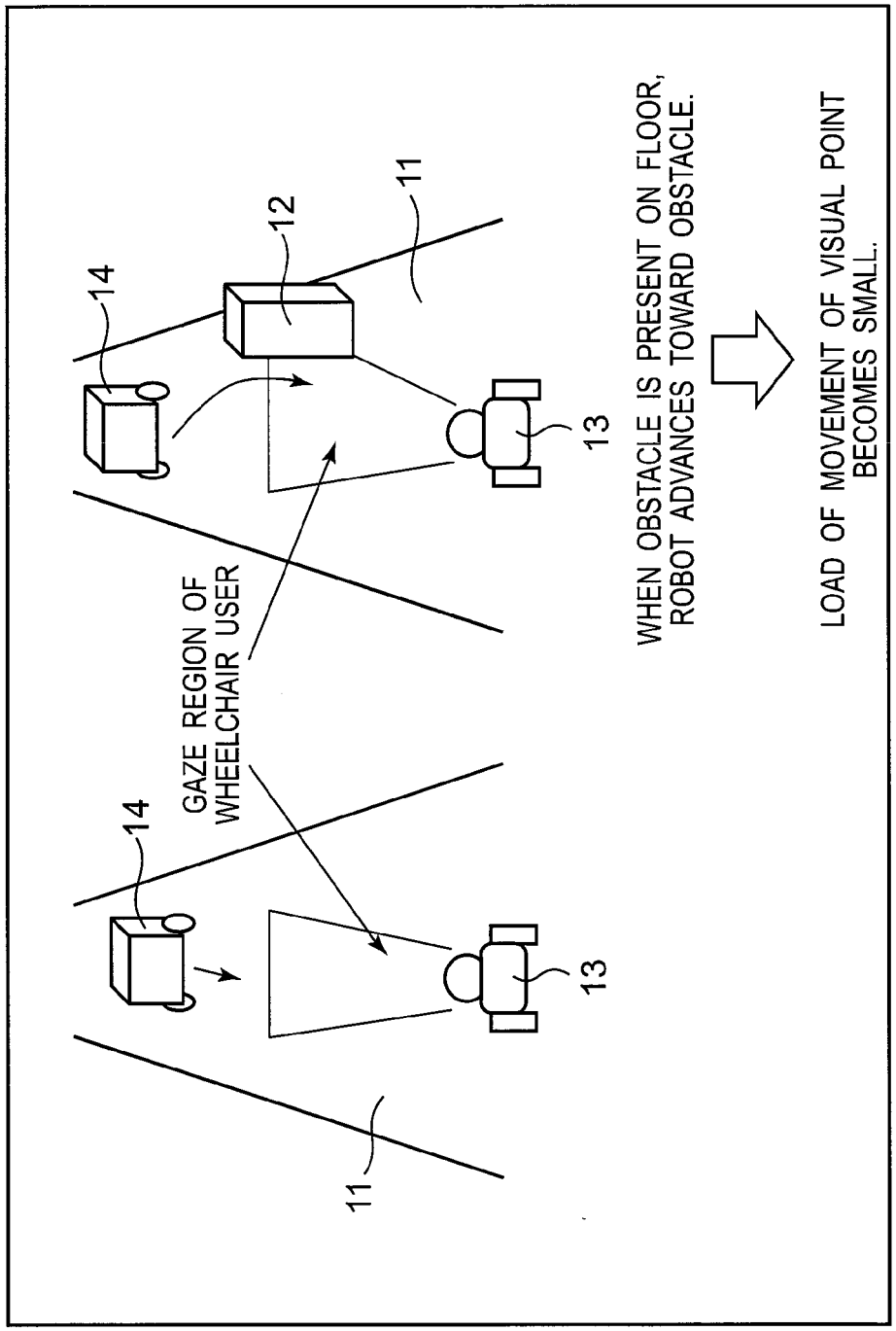
FIG. 3 is an explanatory view illustrating a change in a running route of an autonomous running apparatus according to a first embodiment.

Therefore, when the wheelchair user 13 gazes at the obstacle 12, a running route of the autonomous running apparatus 14 is set so as to be close to a gaze region of the wheelchair user 13, so that the wheelchair user 13 can be made to recognize the presence of the autonomous running apparatus 14. FIG. 3 illustrates routes of the autonomous running apparatus 14 in cases where the obstacle 12 is preset and is not present on the hallway 11 when the wheelchair user 13 moves along the hallway 11. As shown in FIG. 3, when the obstacle 12 is present on the hallway 11, the autonomous running apparatus 14 runs in a direction of the gaze region of the wheelchair user 13 so that the wheelchair user 13 can be made to recognize the presence of the autonomous running apparatus 14.

It is said that, for example, the similar tendency is applied also to a moving person who pushes a baby carriage or an aged person in an electric four-wheel vehicle. Further, for example, a patient who gets a medical care at a department of internal medicine in a hospital has a high tendency to gaze at a direction board of internal medicine.

Referring now to the accompanied drawings the embodiments of the present disclosure will be described in detail below.

Various aspects of the present disclosure are described prior to the detailed description of the embodiments of the present disclosure with reference to the drawings.

Examples of the disclosed technique are as follows.

1st aspect: A running information generating apparatus of an autonomous running apparatus comprising:

a position obtaining unit that obtains a position of a moving person in a building with the position being related to every predetermined time or an amount of time;

a moving person identifying unit that identifies a type of the moving person obtained from the position obtaining unit;

a position history database that records, in chronological order, the position and the type of the moving person obtained by the position obtaining unit and the moving person identifying unit, respectively;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within predetermined distance from the position of the moving person obtained by the position obtaining unit, the moving direction and the moving speed of the moving person calculated by the movement information calculator, and the running information recorded in the autonomous running apparatus database;

an environment database that records a position of a still object present in the building together with information about the moving person who tends to gaze at the still object;

a gaze position obtaining unit that obtains a gaze position of the moving person based on the position and the type of the moving person, the moving direction of the moving person, and the position of the still object;

a gaze region calculator that calculates a gaze region of the moving person based on the position and the type of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the still object, the approach time, and the gaze region.

2nd aspect: A running information generating apparatus of an autonomous running apparatus comprising:

a position obtaining unit that obtains a position of a moving person in a wheelchair in a building with the position being related to every predetermined time or amount of time;

a position history database that records the position of the moving person obtained by the position obtaining unit in chronological order;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within a predetermined distance, from the position of the moving person obtained by the position obtaining unit, the moving direction and the moving speed of the moving person calculated by the movement information calculator, and the running information recorded in the autonomous running apparatus database;

an obstacle database that records a position of an obstacle in the building;

a gaze position obtaining unit that obtains a gaze position of the moving person based on the position of the moving person, the moving direction of the moving person, and the position of the obstacle;

a gaze region calculator that calculates a gaze region of the moving person based on the position of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the obstacle, the approach time, and the gaze region.

According to the above aspect, the running information generating apparatus can generate running information that enables a moving person (for example, a wheelchair user) to recognize the presence of the autonomous running apparatus more securely and enables the autonomous running apparatus to run suitably even when a moving person is present. Such a constitution, therefore, can generate a route such that when the moving person who faces the autonomous running apparatus is a wheelchair user, the autonomous running apparatus is made to run in a region where the wheelchair user is likely to gaze and gazes at an obstacle at his/her feet and thus the wheelchair user can be made to recognize presence of the autonomous running apparatus more securely.

3rd aspect: 3. The running information generating apparatus of the autonomous running apparatus according to the 2nd aspect, wherein the gaze position obtaining unit obtains the gaze position of the moving person based on the position of the moving person, the moving direction and the moving speed of the moving person, and the position of the obstacle, the gaze region calculator calculates the gaze region of the moving person based on the position of the moving person, the moving direction and the moving speed of the moving person, and the gaze position.

The above aspect enables prediction of a gaze position that is relatively viewed from the moving person after a current time (a time at which position information about a mobile object is obtained by the gaze position obtaining unit used for obtaining a gaze position of a moving person by a gaze position obtaining unit). In such a constitution, therefore, when the autonomous running apparatus moves into a region to be the gaze position of the moving person in the future in advance, the autonomous running apparatus generates the route that enables the moving person to recognize the presence of the autonomous running apparatus well in advance.

4th aspect: The running information generating apparatus of the autonomous running apparatus according to the 2nd aspect, wherein the gaze region calculator calculates the gaze region referring to also a height of the moving person.

According to the above aspect, consideration of a height of the moving person (for example, a wheelchair user) enables the relative gaze position from a viewpoint of the moving person to be predicted more accurately. In such a constitution, therefore, the route that enables the moving person to recognize the presence of the autonomous running apparatus more securely can be generated.

5th aspect: The running information generating apparatus of the autonomous running apparatus according to the 4th aspect, wherein the height of the moving person is estimated based on any one of height information, age information, and sitting height information recorded in an ID tag owned by the moving person.

According to the above aspect, when the height of the moving person is set for each moving person, a relative gaze position viewed from the moving person can be predicted more accurately. In such a constitution, therefore, the route that enables the moving person to recognize the presence of the autonomous running apparatus more securely can be generated.

6th aspect: The running information generating apparatus of the autonomous running apparatus according to any one of the 1st to 5th aspects, wherein the running information generator generates the running information for making the autonomous running apparatus run into the gaze region calculated by the gaze region calculator at the predetermined time earlier than the approach time calculated by the approach time calculator, based on a positional relationship between the autonomous running apparatus and the moving person or/and a positional relationship between the autonomous running apparatus and the obstacle.

According to the above aspect, in consideration of a moving state of the moving person and position information about a still obstacle (in other words, a positional relationship between the autonomous running apparatus and the moving person (for example, the wheelchair user), and a positional relationship between the autonomous running apparatus and the obstacle), when the autonomous running apparatus is not sufficiently separated from the moving person, the autonomous running apparatus can be moved immediately to the gaze region of the moving person in order to secure safety of the moving person, and when the autonomous running apparatus is sufficiently separated from the moving person, the autonomous running apparatus can be moved to a gaze region of the person in a careful manner (for example, a moving speed is decreased) in order to secure the safety of the autonomous running apparatus. Such a constitution, therefore, can provide the route where while the safety of the moving person is prioritized, the autonomous running apparatus can made to be run with its safety being considered according to the moving state of the moving person and position information about the still obstacle (a positional relationship between the autonomous running apparatus and the moving person and the obstacle). Insufficient separation means a state that, as one example, even if the autonomous running apparatus is not immediately (for example, after one to a several seconds for consideration of a running error of the autonomous running apparatus and an amount of time to make the moving person recognize the autonomous running apparatus) made to run to a gaze region, the autonomous running apparatus cannot be made to enter the gaze region within the predetermined amount of time.

7th aspect: The running information generating apparatus of the autonomous running apparatus according to any one of the 1st to 6th aspects, wherein the running information generated by the running information generator is recorded in the autonomous running apparatus database.

8th aspect: The running information generating apparatus of the autonomous running apparatus according to any one of the 1st to 7th aspects, wherein when the building is a hospital and the moving person is a patient, the patient has an identifier for identifying the patient in the hospital, the running information generating apparatus further comprises:

a patient information storage that stores information about diagnosis and treatment departments where the patient visits in the hospital in the identifier, notice information about the diagnosis and treatment departments stored in the patient information storage, and information about a posting position of the notice information in the hospital being stored in the environment database, the position obtaining unit detecting information of the identifier which the moving person has; and a patient check space specifying unit that specifies a posting position of information checked by the moving person based on the information about the diagnosis and treatment departments of the patient corresponding to the identifier detected by the position obtaining unit and the posting position of the notice information in the hospital, the notice information relating to the diagnosis and treatment departments and being stored in the environment database, the gaze region calculator calculating a gaze region gazed by the moving person, using the posting position of the information specified by the patient check space specifying unit.

According to the above aspect, notice information related to the moving person such as the wheelchair user (namely, who tends to gaze at the information) can be obtained based on information about diagnosis and treatment departments corresponding to an identifier owned by the wheelchair user. Such a constitution, therefore, can provide a route where when a region that is considered as the gaze region of the wheelchair user increases, the possibility that the autonomous running apparatus can enter the gaze region in the predetermined time can be improved.

9th aspect: The running information generating apparatus of the autonomous running apparatus according to the 8th aspect, wherein the identifier is an identifier for specifying a diagnosis and treatment department where the moving person visits, the information about the posting position of the notice information about the diagnosis and treatment department for the moving person on a passage in the hospital are stored in the environment database, the gaze region calculator widens the gaze region of the moving person based on information about a space position in the notice information checked by the moving person.

According to the above aspect, a gaze region calculator can correct the gaze region of the wheelchair user based on notice information (for example, information about diagnosis and treatment departments) that is checked by the moving person and a position of the notice information (for example, direction board) to which the moving person, such as the wheelchair user, is likely goes, and the gaze region of the wheelchair user can be generated more accurately. Therefore, a route, which can make the autonomous running apparatus run more securely toward the direction of the gaze region of the wheelchair user and enables the wheelchair user to securely recognize the presence of the autonomous running apparatus, can be generated.

10th aspect: The running information generating apparatus of the autonomous running apparatus according to any one of the 1st to 9th aspects, wherein when a plurality of the gaze positions are present, the gaze region calculator sets segments or regions that make connection between the plurality of gaze positions, as the gaze position.

According to the above aspect, when a plurality of gaze positions are present, the moving person is likely to move his/her gaze between the gaze positions, and thus gaps between the gaze positions can be also included in the gaze position. According to such a constitution, therefore, the gaze region of the moving person can be generated more accurately. Therefore, a route, which makes the autonomous running apparatus run toward the gaze region of the moving person more securely, and enables the moving person to recognize the autonomous running apparatus more securely, can be generated.

11th aspect: The running information generating apparatus of the autonomous running apparatus according to any one of the 1st to 7th aspects, wherein when the building is a hospital and the moving person is a patient, the patient has an identifier for identifying the patient in the hospital, the running information generating apparatus further comprises:

a patient information storage that stores, in the identifier, information about a wheelchair used by the patient in the hospital, the position obtaining unit detecting information about the identifier which the moving person has; and an avoidance distance specifying unit that specifies an avoidance distance of the moving person with respect to the obstacle from the information about the wheelchair of the patient corresponding to the identifier detected by the position obtaining unit, the running information generator generating the running information based on the gaze region calculated by the gaze region calculator, and the avoidance distance specified by the avoidance distance specifying unit.

According to the above aspect, performance of the wheelchair is specified by the identifier based on a movement history of the wheelchair manipulated by the wheelchair user or tag information provided to the wheelchair, so that a distance that can provide easy avoidance can be specified. Therefore, a route generator can generate a more suitable avoiding route of the autonomous running apparatus based on characteristic information about the wheelchair of the wheelchair user. As a result, a route, which makes the autonomous running apparatus run toward the gaze region of the wheelchair user more securely and enables the wheelchair user to recognize the presence of the autonomous running apparatus more securely, can be generated. The movement history of the wheelchair is used for estimating an avoidance characteristic of the wheelchair but not for estimating habituation of the wheelchair user.

12th aspect: The running information generating apparatus of the autonomous running apparatus according to the 11th aspect, wherein in the patient information storage, as the patient uses the wheelchair for a long time, the avoidance distance in the avoidance distance specifying unit is shorter.

According to the above aspect, a degree of wheelchair user's habituation to the wheelchair is estimated based on a wheelchair use period of the wheelchair user as one example of the moving person, so that an avoidance distance required for the wheelchair user to easily avoid an obstacle can be specified. Therefore, the route generator can generate a more suitable avoiding route of the autonomous running apparatus based on the degree of the wheelchair user's habituation to the wheelchair. As a result, a route, which makes the autonomous running apparatus run toward the gaze region of the wheelchair user more securely and enables the wheelchair user to recognize the presence of the autonomous running apparatus more securely, can be generated.

13th aspect: A running information generating apparatus of an autonomous running apparatus comprising:

a movement information calculator that calculates a moving direction and a moving speed of a moving person from information in a position history database in which a position of the moving person in a building obtained by relating the position to each predetermined time or amount of time and a type of the moving person obtained by identification are recorded in chronological order;

an approach time calculator that calculates an approach time at which the autonomous running apparatus and the moving person approach to each other within a predetermined distance from the position of the moving person obtained by the position obtaining unit, the moving direction and the moving speed of the moving person calculated by the movement information calculator, and running information recorded in an autonomous running apparatus database for recording the running information for making the autonomous running apparatus that runs along a route preset in the building run from a first position to a second position;

a gaze position obtaining unit that obtains a gaze position of the moving person based on the position and the type of the moving person, the moving direction of the moving person, and a position of a still object obtained from an environment database for recording the position of the still object present in the building together with information about the moving person who tends to gaze at the still object;

a gaze region calculator that calculates a gaze region of the moving person based on the position and the type of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the still object, the approach time, and the gaze region.

According to the aspect, the running information generating apparatus can generate running information that enables the moving person to recognize the presence of the autonomous running apparatus more securely, and the autonomous running apparatus to run suitably in accordance with the type of the moving person.

According to another aspect of the present disclosure, there is provided a running information generating apparatus of an autonomous running apparatus, the apparatus comprising a movement information calculator that calculates a moving direction and a moving speed of a moving person from information in a position history database in which positions of the moving person obtained by relating a position of the moving person in a wheelchair in a building to every predetermined time or amount of time are recorded in chronological order, an approach time calculator that calculates an approach time at which the autonomous running apparatus and the moving person approach to each other within a predetermined distance from the position of the moving person, the moving direction and the moving speed of the moving person, and running information recorded in an autonomous running apparatus database for recording running information for making the autonomous running apparatus that runs along a preset route in a building run from a first position to a second position, a gaze position obtaining unit that obtains a gaze position of the moving person based on the position of the moving person, the moving direction of the moving person, and a position of an obstacle recorded in an obstacle database for recording the position of the obstacle in the building, a gaze region calculator that calculates a gaze region of the moving person based on the position of the moving person, the moving direction of the moving person, and the gaze position, and a running information generator that generates running information for making the autonomous running apparatus run into the gaze region based on the position of the obstacle, the approach time, and the gaze region at a predetermined time earlier than the approach time.

According to the thirteenth aspect or another aspect after the thirteenth aspect, the running information generating apparatus can generate running information that enables the moving person such as the wheelchair user to recognize the presence of the autonomous running apparatus more securely and enables the autonomous running apparatus to run suitably even when the wheelchair user is present. According to such a constitution, therefore, when the person who faces the autonomous running apparatus is a wheelchair user, a route that enables the wheelchair user to recognize the presence of the autonomous running apparatus more securely by making the autonomous running apparatus run within a region where the wheelchair user gazes at an obstacle at his/her feet that is likely to be gazed, can be generated.

14th aspect: An autonomous running apparatus comprising:

the running information generating apparatus of the autonomous running apparatus described in any one of the 1st to 13th aspects;

a running information obtaining unit that obtains the running information recorded in the autonomous running apparatus database; and a driving device controller that controls running based on the running information obtained by the running information obtaining unit.

According to the above aspect, the moving person such as the wheelchair user can be made to recognize the presence of the autonomous running apparatus more securely, and the autonomous running apparatus can be made to run suitably even when the wheelchair user is present. According to such a constitution, therefore, when the person who faces the autonomous running apparatus is the wheelchair user, the autonomous running apparatus is made to run within the region where the wheelchair user gazes at an obstacle at his/her feet that is likely to be gazed at, so that the wheelchair user can be made to recognize the presence of the autonomous running apparatus more securely.

15th aspect: A running information generating method of an autonomous running apparatus comprising:

obtaining, by a position obtaining unit, a position of a moving person in a building with the position being related to every predetermined time or amount of time;

identifying, by a moving person identifying unit, a type of the moving person obtained from the position obtaining unit;

recording the position and the type of the moving person obtained by the position obtaining unit and the moving person identifying unit, in a position history database in chronological order;

calculating, by a movement information calculator, a moving direction and a moving speed of the moving person from information in the position history database;

recording, in an autonomous running apparatus database, running information for making the autonomous running apparatus that runs along a route preset in the building run from a first position to a second position;

calculating, by an approach time calculator, an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;

recording, in an environment database, a position of a still object present in the building together with information about the moving person who tends to gaze at the still object;

obtaining, by a gaze position obtaining unit, a gaze position of the moving person based on the position and the type of the moving person, the moving direction of the moving person, and a position of the still object;

calculating, by a gaze region calculator, a gaze region of the moving person based on the position and the type of the moving person, the moving direction of the moving person, and the gaze position; and generating, by a running information generator, the running information for making the autonomous running apparatus run into the gaze region calculated by the gaze region calculator at a predetermined time earlier than the approach time calculated by the approach time calculator based on the position of the still object, the approach time, and the gaze region.

According to another aspect of the present disclosure, there is provided a running information generating method of an autonomous running apparatus, the method comprising obtaining, by a position obtaining unit, a position of a moving person in a wheelchair in a building with the position being related to a predetermined time or amount of time, recording the position of the moving person obtained by the position obtaining unit in the position history database in chronological order in a position history database, calculating, by a movement information calculator, a moving direction and a moving speed of the moving person from information in the position history database, calculating, by a approach time calculator, an approach time at which the autonomous running apparatus and the moving person approach to each other within a predetermined distance from the position of the moving person obtained by the position obtaining unit, the moving direction and the moving speed of the moving person calculated by the movement information calculator, and running information recorded in an autonomous running apparatus database in which the running information for making the autonomous running apparatus that runs along a predetermined route in the building run from a first position to a second position is recorded, obtaining, by a gaze position obtaining unit, a gaze position of the moving person based on the position of the moving person, the moving direction of the moving person, and a position of an obstacle in an obstacle database in which the position of the obstacle in the building is recorded, calculating, by a gaze region calculator, a gaze region of the moving person based on the position of the moving person, the moving direction of the moving person, and the gaze position, and generating, by a running information generator, running information for making the autonomous running apparatus run into the gaze region calculated by the gaze region calculator at a predetermined time earlier than the approach time calculated by the approach time calculator based on the position of the obstacle, the approach time, and the gaze region.

According to the above aspect, the running information generating apparatus can generate the running information that enables the moving person such as the wheelchair user to recognize the presence of the autonomous running apparatus more securely, and enables the autonomous running apparatus to run suitably even when the wheelchair user is present. According to such a constitution, therefore, when the person who faces the autonomous running apparatus is the wheelchair user, the autonomous running apparatus is made to run within the region where the wheelchair user gazes at an obstacle at his/her feet that is likely to be gazed at, so that the wheelchair user can be made to recognize the presence of the autonomous running apparatus more securely.

16th aspect: A running information generating program for making a computer execute the running information generating method of the 15th aspect.

Another aspect: A running information generating program for making a computer execute the running information generating method of another aspect after the 15th aspect.

According to the fifteenth aspect or another aspect after the fifteenth aspect, the running information generating apparatus can generate the running information that enables the moving person such as the wheelchair user to recognize the presence of the autonomous running apparatus more securely and enables the autonomous running apparatus to run suitably even when the wheelchair user is present. According to such a constitution, therefore, when the person who faces the autonomous running apparatus is the wheelchair user, the autonomous running apparatus is made to run within the region where the wheelchair user gazes at an obstacle at his/her feet that is likely to be gazed at, so that the wheelchair user can be made to recognize the presence of the autonomous running apparatus more securely.

The embodiments of the present disclosure are described below with reference to the accompanying drawings.

Embodiments described below are only concrete examples of the present disclosure. Numerical values, shapes, materials, components, arrangement positions and connecting forms of the components, steps and an order of the steps, which are shown in the embodiments, are examples, and thus they do not limit the present disclosure. Further, some of the components in the following embodiments that are not described in independent claims representing the superordinate concepts are described as any components.

A first embodiment describes a wheelchair user as an example of a type of the moving person, a second embodiment describes a patient in a hospital as an example of the type of the moving person, and a third embodiment describes a novice wheelchair user as an example of the type of the moving person.

First Embodiment

Figure 4A:
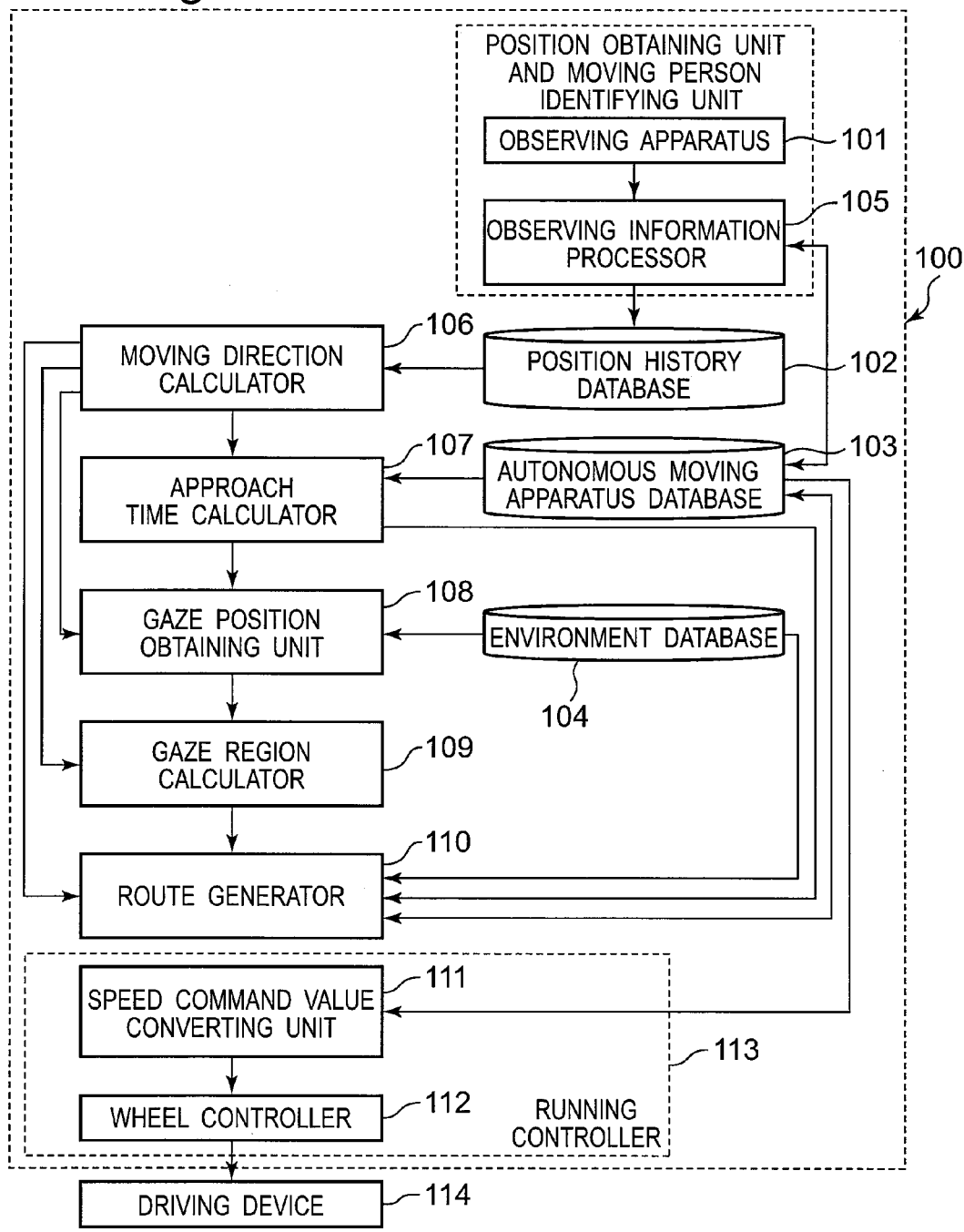
FIG. 4A is a block diagram illustrating a functional constitution of a running information generating apparatus of the autonomous running apparatus according to the first embodiment.

FIG. 4A illustrates a functional constitution of a running information generating apparatus 100 mounted into an autonomous running apparatus 204 in the first embodiment.

As shown in FIG. 4A, the running information generating apparatus 100 of the autonomous running apparatus 204 includes at least an observing apparatus 101, a position history database 102, an autonomous running apparatus database 103, an environment database 104, a moving direction calculator 106, an approach time calculator 107, a gaze position obtaining unit 108, a gaze region calculator 109, and a route generator 110. The running information generating apparatus 100 of the autonomous running apparatus 204 may further includes an observation information processor 105, a speed command value converter 111, and a wheel controller 112. An example of the autonomous running apparatus 204 is a robot that moves with two wheels 115 shown in FIG. 26.

Respective components of the running information generating apparatus 100 are described below.

<Constitution>

<Observing Apparatus 101>

The observing apparatus 101 is one example of a position obtaining unit. The observing apparatus 101 observes the mobile object present within the observation range (specifically, obtains the position(s) of the mobile object in chronological order (related to each predetermined time or amount of time)). The observation range of the observing apparatus 101 is a range where radio waves can be transmitted/received when, for example, the observing apparatus 101 is a tag reader, and may include an entire building. Further, the observing apparatus 101 makes an observation with a predetermined observation period (for example, 100 msec). The observing apparatus 101 functions also as one example of a moving person identifying unit (a moving person type information obtaining unit) for identifying a type of a moving person obtaining by the position obtaining unit. That is to say, in this embodiment, the observing apparatus 101 is used in common as the position obtaining unit and the type identification information obtaining unit.

In this specification, the building generally means a hospital, a nursing home for the aged, a public welfare facility, a shopping mall, or an airport where a lot of wheelchair users come and go. Further, in this specification, the mobile object means any of the autonomous running apparatus 204 and the moving person (specifically, the normal pedestrian or a vehicle manipulator (wheelchair user 203 or the like)). The moving person includes a vehicle manipulator who manipulates a vehicle (a hand cart, a wheelchair, or an electric four-wheel vehicle), and a pedestrian (the normal pedestrian). Further, the vehicle manipulator means a person who moves (walks or runs) while manipulating any vehicle, such as a wheelchair user, a moving person who pushes a vehicle (a hand cart) such as a baby carriage, an aged person who rides on an electric four-wheel vehicle for the aged, and a moving person who pushes a vehicle (a hand cart) such as a shopping cart in a shipping mall or a baggage cart in an airport. Therefore, the type of the moving person in this specification is discriminated into at least a normal pedestrian or a vehicle manipulator. Further, when the type is discriminated in more detail, as the type of the moving person, the vehicle manipulator may be classified into a wheelchair user 203, a moving person who pushes a vehicle (hand cart) such as a baby carriage, an aged person who rides on an electric four-wheel vehicle for the aged, and a moving person who pushes a vehicle (hand cart) such as a shopping cart in a shopping mall or a baggage cart in an airport.

When the observing apparatus 101 is a tag reader, the tag reader detects a tag that is present within a UWB (Ultra Wide Band) tag detection range of an antenna connected to the tag reader, and obtains tag information recorded in the tag. When the observing apparatus 101 is an image sensor, the image sensor obtains an image. When the image sensor obtains an image, for example, an image recognizing processor in the observation information processor 105 recognizes an image, and functions also as one example of the moving person identifying unit for distinguishing between a vehicle manipulator and a pedestrian. For example, the pedestrian is long and thin vertically, whereas the vehicle manipulator has a width in a front-back direction and a low height or has a step between the person and the vehicle in its height. Both of the person and the vehicle may be discriminated in an image recognizing process based on these characteristics. When the observing apparatus 101 is a distance image sensor, the distance image sensor obtains a distance image. The image recognizing process for the obtained distance image is similar to the above-described image recognizing process.

Figure 5:
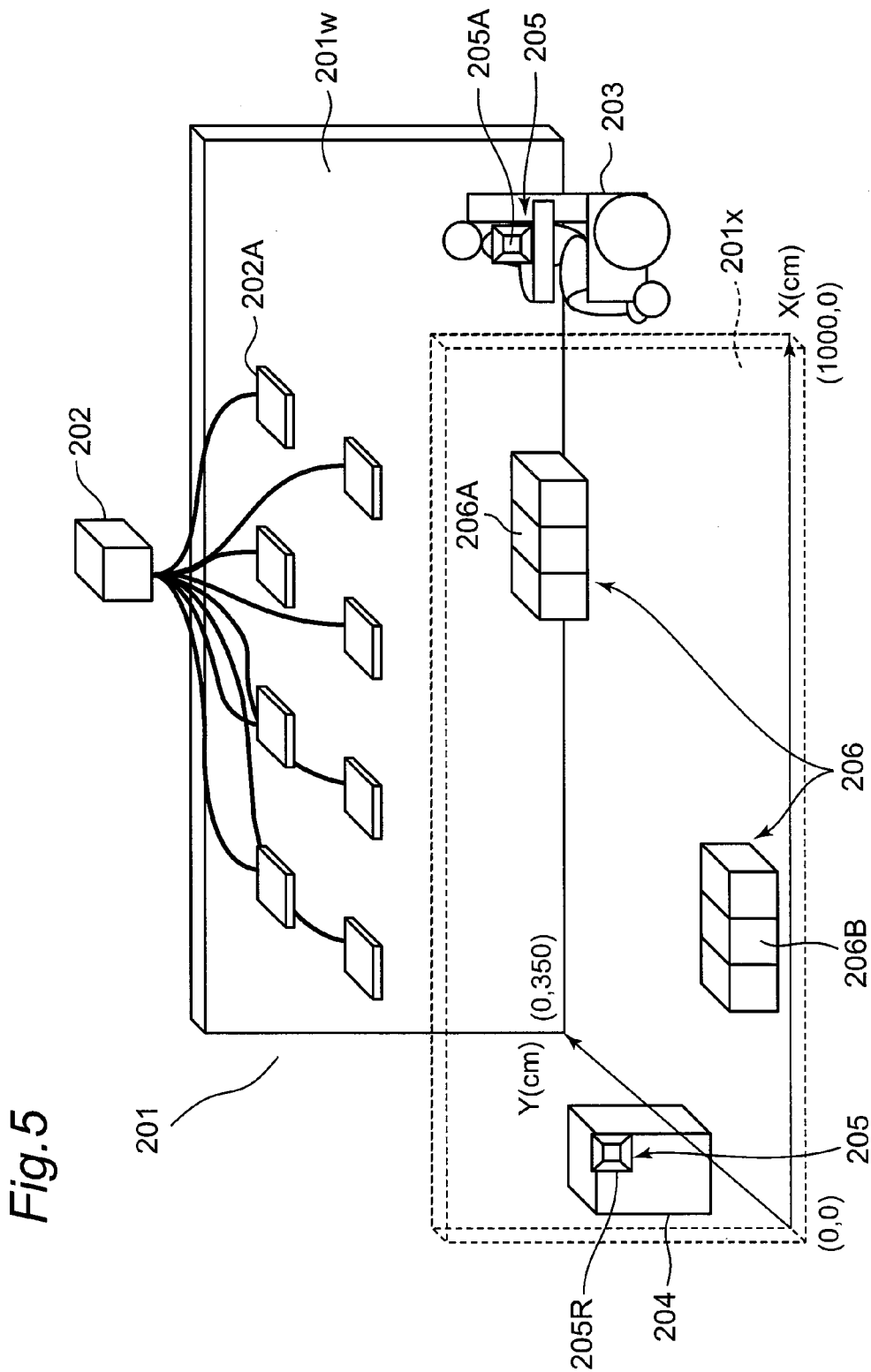
FIG. 5 is an environment view where the autonomous running apparatus is present according to the first embodiment.

FIG. 5 illustrates a passage 201 as a specific example in a hospital having a tag reader 202 as one example of a specific constitution of the observing apparatus 101. The passage 201 is sandwiched between walls 201w and 201x on its both sides. Antennas 202A of the tag reader 202 are dispersedly arranged on a ceiling of the passage 201, and the tag reader 202 detects a tag 205A owned by a person (a moving person in a wheelchair) 203 present on the passage 201, and a tag 201R owned by the autonomous running apparatus 204. Thereafter, any one of the tag 205A and the tag 205R present on the passage 201 is described as representatives for a tag 205. ID information (hereinafter, a tag ID or TAG_ID) peculiarly allocated to the tag 205, and type information about mobile objects 203 and 204 having the tag 205 are registered in the tag 205. FIG. 6 illustrates one example of the tag information recorded in the tag 205. The example of FIG. 6 shows that the autonomous running apparatus (ROBOT) (here, representing a reference numeral 204) has the tag 205 of TAG_ID=TAG_001. FIG. 6 shows that a wheelchair user (WHEEL_CHAIR) (here, reference numeral 203) has the tag 205 of TAG_ID=TAG_002. FIG. 6 shows that the normal pedestrian (HEALTHY_PERSON) has the tag 205 of TAG_ID=TAG_003. On the passage 201, a chair 206A and a chair 206B as one example of an obstacle for a mobile object are arranged. Hereinafter, one of the chair 206A and the chair 206B provided on the passage 201 is described as a representative of the chair 206. In this embodiment, it is assumed that the moving people including a vehicle manipulator and a pedestrian peculiarly have the tags, respectively. The tag includes also identification information for identifying a person (at least, moving person identification information for identifying the type of the moving person). The type of the moving person means at least information about a vehicle manipulator or a pedestrian.

<Observation Information Processor 105>

The observation information processor 105 processes observation information obtained by the observing apparatus 101, and obtains an ID, a type, and a time-series position of a mobile object present in an observation range of the observing apparatus 101, so as to store the obtained information in the position history database 102 and the autonomous running apparatus database 103.

A process in a case where a tag reader is used as the observing apparatus 101 is described. The mobile object to be observed by the tag reader has a tag detectable by the tag reader, and at least an ID (hereinafter, a tag ID) and a type of the mobile object to be peculiarly allocated to the tag are recorded in the tag as tag information. When the tag is detected, the ID and the type of the mobile object can be obtained (the ID of the mobile object is considered as a tag ID). Further, the position of the mobile object can be obtained by three-point positioning. A distance between the tag and each antenna can be obtained based on a time lag between output of a question wave from the antenna and reception of a response wave output from the tag. When the arrangement positions of the antennas of the tag reader are already known and at least three or more antennas can detect the tag, the observing apparatus 101 can uniquely specify the position of the tag. As one example, the ID, the type, and the time-series positions of the mobile object obtained by the observation information processor 105 are recorded in the position history database 102 together with a time at which the tag reader 202 detects the tag 205.

Figure 4B:
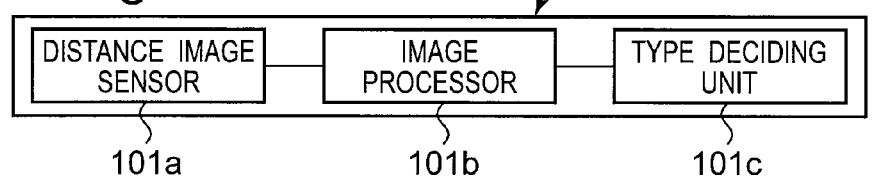
FIG. 4B is a block diagram illustrating a functional constitution of an observing apparatus in the running information generating apparatus of the autonomous running apparatus according to the first embodiment.

Next, a process in a case where a distance image sensor is used as the observing apparatus 101 is described with reference to FIG. 4B. In a preprocess, an image processor 101b of the observing apparatus 101 extracts only a region (a difference region) of the mobile object from a distance image obtained by a distance image sensor 101a using a background differencing technique. When the distance image sensor 101a is installed on the wall 201w or 201x and can detect feet of the mobile object, the feet of the mobile object that is estimated from the difference region may be set as a position of the mobile object. When the distance image sensor 101a is installed on the ceiling and cannot detect the feet of the mobile object, a barycentric position of the difference region may be set as the position of the mobile object. As to the type of the mobile object, a type deciding unit 101c of the observing apparatus 101 can obtain whether the type of the mobile object is the wheelchair user 203, the normal pedestrian, or the autonomous running apparatus 204 using a height and a width of the difference region based on a knowledge about a height of the wheelchair user 203 being lower than a height of the normal pedestrian and is larger in width, and shape information about the autonomous running apparatus 204 recorded in the autonomous running apparatus database 103 as described later. As to the ID of the mobile object, it is difficult to estimate the ID (individual) of the mobile object from the distance image (when the distance image is created by a stereo camera, an image captured by a monocular camera is also included). For this reason, the ID of the mobile object to be output in this process is an internal ID that is validated only in the autonomous running apparatus 204. For example, when an internal ID (001) is assigned to the mobile object first detected, the ID (001) is always assigned to the mobile object while the mobile object is being tracked. The tracking of the mobile object can be realized by using a technique such as optical flow.

<Position History Database 102>

The ID, the type, and the position of the mobile object obtained by the observation information processor 105 are recorded in the position history database 102 together with the time at which the observing apparatus 101 makes observation. That is to say, the positions of the moving person obtained by the observing apparatus 101 are recorded in the position history database 102 via the observation information processor 105 in chronological order.

FIG. 7 illustrates one example of the position history database 102. At 14:23:15.400, the autonomous running apparatus 204 whose mobile object ID is TAG_001 is present on the coordinates (0, 150), and the wheelchair user 203 whose mobile object ID is TAG_002 is on the coordinates (1000, 200). In this example, a tag ID is used as the mobile object ID. In order to simplify the description, only the wheelchair user 203 is present as the moving person in FIG. 5, but if a normal pedestrian having a tag is present, a mobile object ID, a type, and positions of the normal pedestrian are recorded in the position history database 102.

<Environment Database 104>

The environment database 104 is one example of the obstacle database. Position information about still obstacles such as the walls 201w and 201x or the chairs 206 in the building as one example of an environment where the autonomous running apparatus 204 runs, and information about positions where the wheelchair user 203 easily gazes at the still obstacles are recorded in the environment database 104. The still obstacles include still obstacles to be obstacles (including direction boards to be obstacles), and direction boards that are not obstacles (for example, direction boards hanging from the ceilings, and posting signs displayed on floor surfaces of a hallway).

FIG. 8A and FIG. 8B illustrate examples of the environment database 104. In FIG. 8A, coordinates of vertexes of obstacles are recorded as information about obstacles present on the passage 201. Notation of the obstacles are not limited to them. For example, when an obstacle has a columnar shape, information such as a center coordinate, a radius, and a height may be recorded. FIG. 8B, information about gaze positions where the wheelchair user 203 easily gazes at the obstacle, and information about conditions of gazing are recorded. In the example shown in FIG. 8B, the gaze position obtaining unit 108 determines that the wheelchair user 203 easily gazes at the gaze position only when all the conditions are satisfied. Since the wheelchair user 203 generally tends to gaze at the feet on the gaze position, a relationship with respect to a position and a running direction (or an orientation) of the wheelchair user 203, and the position of the obstacle are determined in advance as the conditions. Two kinds of conditions are set in this example. The first condition ("condition 1") is the running direction (or the orientation) of the wheelchair user 203. The second condition ("condition 2") is a distance between the wheelchair user 203 and the obstacle. A +x direction of the wheelchair user 203 is a direction in a range between −90° to +90° with respect to 0° when an x direction is a 0° position. On the other hand, a −x direction is a direction in a range between −90° to +90° with respect to 0° when the −x direction that is 180° opposite to the +x direction is a 0° position.

<Autonomous Running Apparatus Database 103>

Shape information about the autonomous running apparatus 204 is recorded in the autonomous running apparatus database 103 in advance, and a present position, a moving direction, a moving speed, and a desired position of the autonomous running apparatus 204, and information about a route between the present position and the desired position of the autonomous running apparatus 204 are also recorded in the autonomous running apparatus database 103. The present position of the autonomous running apparatus 204 is obtained by the observing apparatus 101 or odometry. The moving speed of the autonomous running apparatus 204 can be estimated by the moving direction calculator 106 based on a history of past positions of the autonomous running apparatus 204 similarly to the wheelchair user. The desired position is set in the autonomous running apparatus database 103 by the route generator 110 before the autonomous running apparatus 204 is operated. The information about the route between the position and the desired position is generated by the route generator 110.

The route information includes speed information and acceleration information at a time when the autonomous running apparatus 204 runs on the route, and the approach time calculator 107 can calculate the desired position or an estimated time of arrival at any position on the route.

Further, the position of the autonomous running apparatus 204 is updated based on the observation information of the observing apparatus 101 or observation information about a sensor mounted to the autonomous running apparatus 204. For example, use of odometry or a Laser Range Scanner is considered as a method for obtaining the position of the autonomous running apparatus 204 based on the observation information in the sensor mounted to the autonomous running apparatus 204. The odometry is a method for measuring a moving amount of the autonomous running apparatus 204 based on rotation angles of the wheels 115 of the autonomous running apparatus 204. When an initial position of the autonomous running apparatus 204 is already known, the position of the autonomous running apparatus 204 during running can be calculated by the position obtaining unit using the odometry. The rotation angles of the wheels 115 are obtained by rotary encoders mounted to motors as one example of a driving device 114 for wheels. As described above, the use of the odometry is one example, and the position of the autonomous running apparatus 204 during running can be calculated by the Laser Range Scanner, a ceiling camera, or estimation based on the route information about the autonomous running apparatus 204. In a block diagram of FIG. 4A, the observation information processor 105 can calculate the position of the autonomous running apparatus 204 based on the observation information in the observing apparatus 101 without particularly providing a position arithmetic unit for the autonomous running apparatus.

When the Laser Range Scanner is used, the observation information processor 105 carries out map matching based on range data obtained by the Laser Range Scanner and the position information about the still obstacles recorded in the environment database 104, so that the position of the autonomous running apparatus 204 (specifically, a position at a time when the Laser Range Scanner obtains the last range data) can be obtained by the observation information processor 105. Since a method for obtaining a current position of the autonomous running apparatus 204 (a position at a time when the observing apparatus 101 makes the last observation) based on the observation information of the observing apparatus 101 is equivalent to the described contents of the observation information processor 105, the description for the method is omitted. When the above methods are combined, the current position of the autonomous running apparatus 204 (the position at a time when the observing apparatus 101 makes the last observation) may be obtained precisely. Further, the moving direction and the moving speed of the autonomous running apparatus 204 can be obtained by the moving direction calculator 106 based on the history of the positions of the autonomous running apparatus 204. Thereafter, the current position of the autonomous running apparatus 204 (the position at the time when the observing apparatus 101 makes the last observation), the moving position, the moving speed, the desired position, and the route information are called "the moving state of the autonomous running apparatus 204".

FIG. 9A to FIG. 9D illustrate examples of the autonomous running apparatus database 103. In FIG. 9A, a lengthwise dimension, a lateral dimension, and a height dimension are recorded as the shape information about the autonomous running apparatus 204. The shape information of the autonomous running apparatus 204 is such that the autonomous running apparatus 204 faces the +X direction. In FIG. 9B, a position of the tag 205R on the autonomous running apparatus 204 (tag position) is recorded. In FIG. 9C, the speed information about the autonomous running apparatus 204 is recorded. The speed information includes a maximum speed, maximum acceleration (deceleration) speed, a maximum swing speed, and a swing acceleration (deceleration) speed. At a time of direct advance, the speed is heightened until the maximum speed by the maximum acceleration speed. At a time of the swing, the swing speed is heightened until the maximum swing speed by a maximum swing acceleration speed. In FIG. 9D, moving route information about the autonomous running apparatus 204 is recorded. The moving route information includes an initial position, a single or a plurality of relay positions, and the desired position. Straight-line movement is carried out between the relay positions (including between the initial position and the relay position, and between the relay position and the desired position), and after arrival at the (x, y) coordinates of the relay position, the swing operation is performed so that the apparatus 204 faces a desired direction θ. Here, θ=0° means a direction of +X coordinate. In the circumstance shown in FIG. 5, the apparatus 204 is moving from a relay position 2 to the desired position.

<Moving Direction Calculator 106>

The moving direction calculator 106 is one example of the movement information calculator. The moving direction calculator 106 calculates at least the position (specifically, a position of the wheelchair user 203 at the time when the observing apparatus 101 makes the last observation), the moving direction, and the moving speed of the wheelchair user 203 based on a history of the position of the mobile object recorded in the position history database 102. Thereafter, the position, the moving direction, and the moving speed of the wheelchair user 203 are called "the moving state of the wheelchair user 203".

With reference to FIG. 7, as to the positions of the mobile objects at the last observation using the tag reader 202, at 14:23:15.600, the autonomous running apparatus 204 whose mobile object ID is TAG_001 is present on the coordinates (20, 150), the wheelchair user 203 whose mobile object ID is TAG_002 is present on the coordinates (980, 200) at the same time. The positions (coordinates) are obtained from the position history database 102 by the moving direction calculator 106. Further, the moving direction calculator 106 calculates the moving direction and the moving speed of the mobile object based on the history of the positions of the mobile object recorded in the position history database 102. With reference to FIG. 7, when the current time is 14:23:15.600, the autonomous running apparatus 204 whose mobile object ID is TAG_001 moves in the +X coordinate direction at a speed of 1 meter per second, and the wheelchair user 203 whose mobile object ID is TAG_002 moves in the −X coordinate direction at a speed of 1 meter per second. The moving speed can be, for example, an average speed in the used observation information of the history. Further, the moving direction can be, for example, obtained by the moving direction calculator 106 by using a least squares method. In the example of the position history database 102 shown in FIG. 7, the number of histories is three, but the number of histories to be used for calculating the moving speed and the moving direction of the mobile object may be at least two or more.

<Approach Time Calculator 107>

The approach time calculator 107 determines whether the autonomous running apparatus 204 and the mobile object whose type is the wheelchair user 203 approach to each other within a predetermined distance in a predetermined amount of time after a current time (the time at which the observing apparatus 101 makes the last observation) based on the moving state of the autonomous running apparatus 204 and the moving state of the wheelchair user 203, the moving states obtained from the moving direction calculator 106. When the approach time calculator 107 determines that the autonomous running apparatus 204 and the mobile object of the wheelchair user 203 approach to each other with the predetermined distance, the approach time calculator 107 calculates an approach time at which a distance between the autonomous running apparatus 204 and the mobile object becomes the predetermined distance. It is considered that the mobile object (here, the wheelchair user 203) maintains the moving state of the wheelchair user 203 output from the moving direction calculator 106 (linear uniform motion). Further, as to the moving state of the autonomous running apparatus 204, the information about the moving state of the autonomous running apparatus 204 is obtained by the approach time calculator 107 with reference to the autonomous running apparatus database 103.

An example of a method for determining whether the approach within the predetermined distance is made by the approach time calculator 107 is a method for generating a configuration space by the approach time calculator 107, and then determining whether a locus of the autonomous running apparatus 204 is included in a region formed by the wheelchair user 203 in a space including a time base, using the approach time calculator 107. Details of the configuration space will be described in detail later.

<Gaze Position Obtaining Unit 108>

Only when the approach time is output from the approach time calculator 107, the gaze position obtaining unit 108 obtains a gaze position that tends to be gazed at by the wheelchair user 203, based on the moving state of the wheelchair user 203 (a position, a moving direction, and a moving speed) obtained by the moving direction calculator 106, and the position information about the still obstacles recorded in the environment database 104. The gaze position is a position on which the wheelchair user 203 is expected to frequently make gazing within the predetermined amount of time after the current time (the time at which the tag reader 202 makes the last observation, the tag reader serving as one example of the specific constitution of the observing apparatus 101). When the approach time is not output from the approach time calculator 107, the gaze position obtaining unit 108 does not obtain the gaze position. Since a case where the wheelchair user 203 stops is considered as the moving state, the moving speed is not always necessary.

Figure 10A:
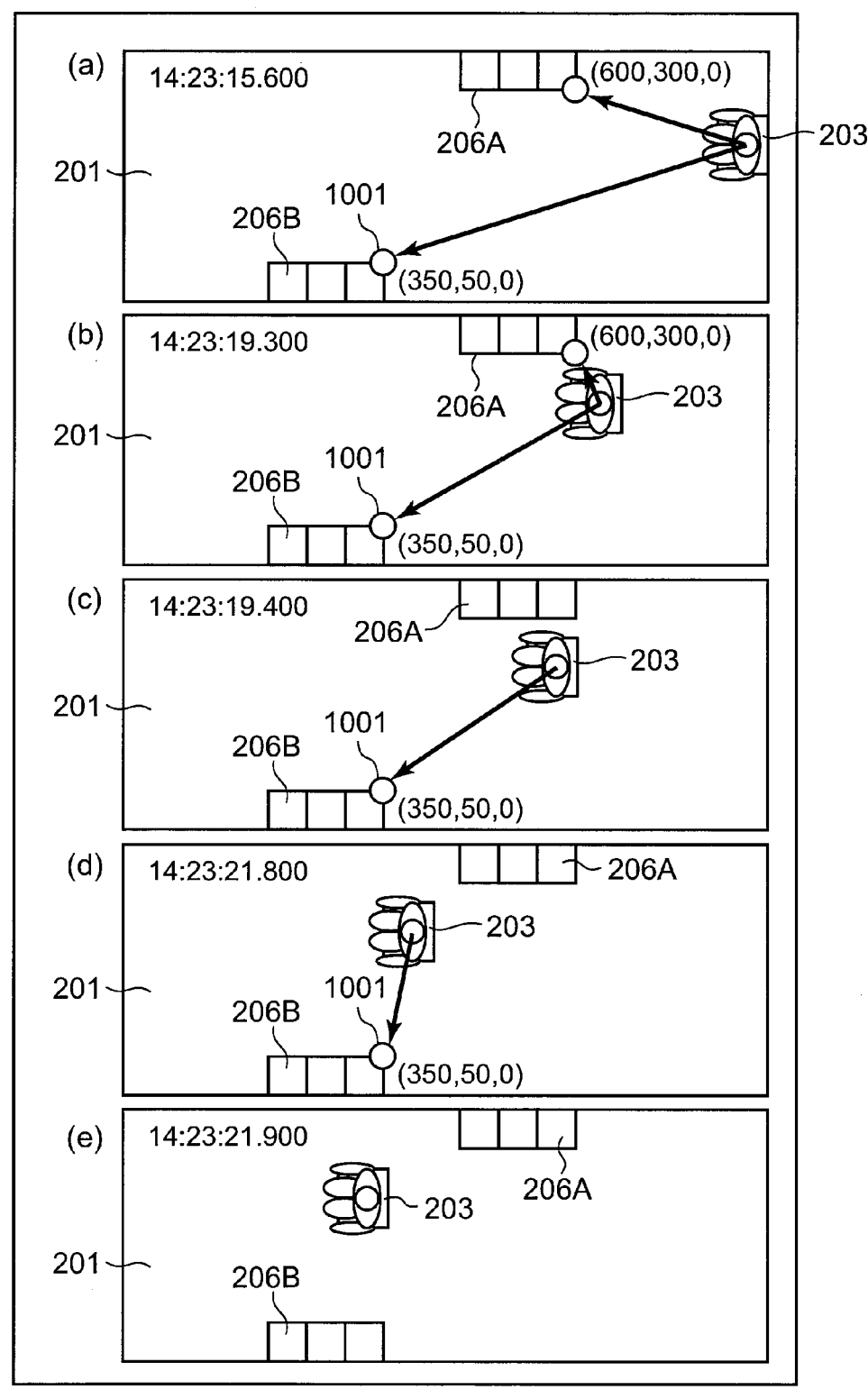
FIG. 10A is an explanatory view illustrating one example of a gaze position of a wheelchair user.
Figure 10B:
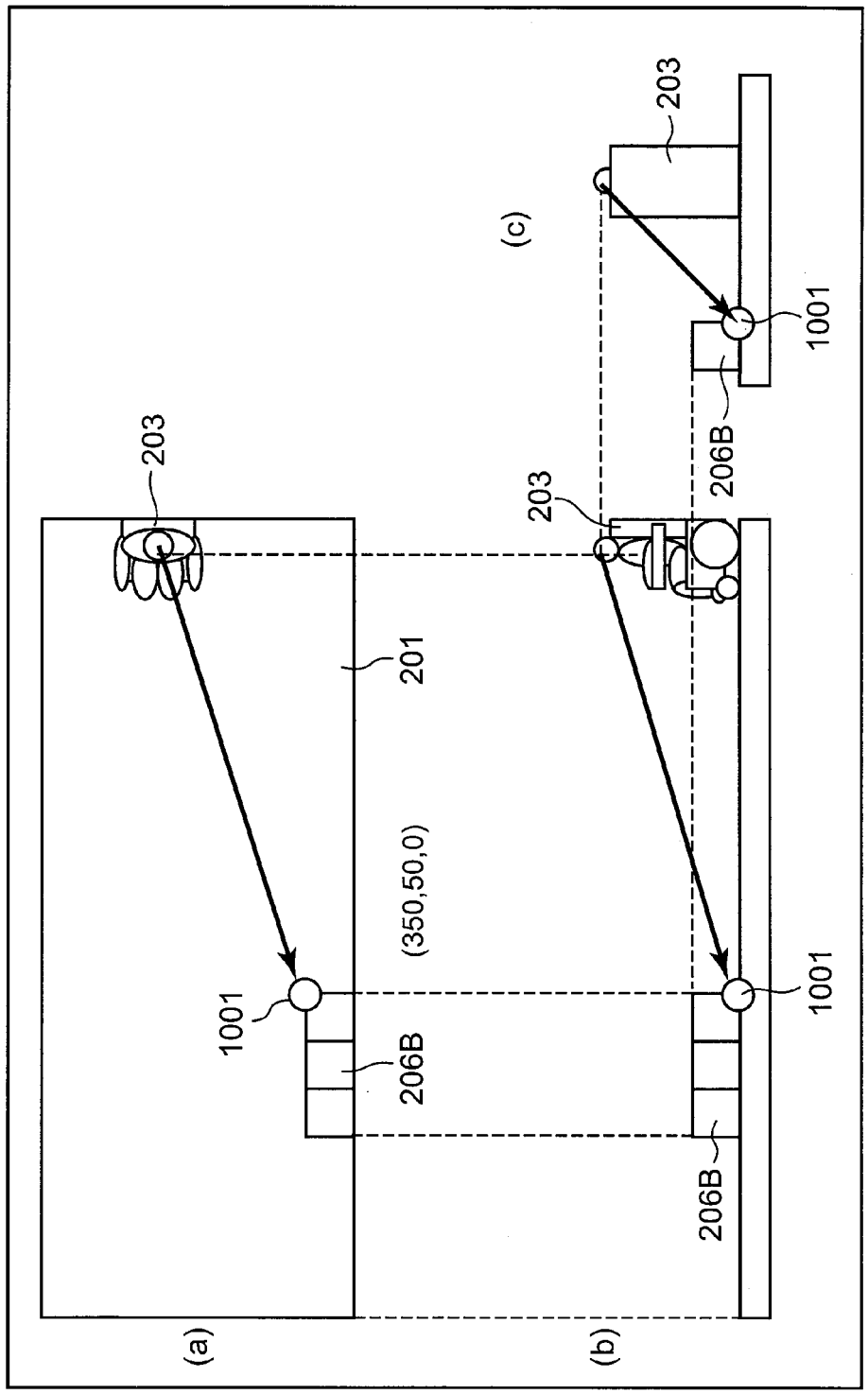
FIG. 10B is an explanatory view illustrating another example of the gaze position of the wheelchair user.

In FIG. 10A, (a) to (e) illustrate states of the gaze positions that vary with times. When it is considered that the wheelchair user 203 maintains the moving speed and the moving direction calculated by the moving direction calculator 106 and makes the linear uniform motion, the gaze position (the coordinate) easily gazed by the wheelchair user 203 includes two coordinates (600, 300, 0) of the chair 206A and (350, 50, 0) of the chair 206B between the current time shown in (a) of FIG. 10A (14:23:15.600) and 14:23:19.400 shown in (c) of FIG. 10A (see (a) and (b) of FIG. 10A). Since the wheelchair user 203 passes through the gaze position of the chair 206A after 14:23:19.400 shown in (c) of FIG. 10A, the gaze position is only the coordinates (350, 50, 0) of the chair 206B (see (c) and (d) of FIG. 10A). Further, the wheelchair user 203 passes through the gaze position of the chair 206B, no gaze position is present after 14:23:21.900 shown in (e) of FIG. 10A (see (e) of FIG. 10A). In FIG. 10B, (a) to (c) are respectively a plan view, a side view, and a rear view illustrating conditions where the wheelchair user 203 gazes at a gaze position 1001 of the chair 206B at the time 14:23:15.600. In FIG. 10B, the gaze positions of the chair 206A and the chair 206A are omitted for ease of viewing.

The gaze position is not limited to a point, and may be a segment or a region. For example, when two or more gaze positions are present, the wheelchair user 203 is likely to check these gaze positions alternately. At this time, when it is considered that eyes moves on a segment that connects the gaze positions, the entire segment can be regarded as the gaze position. Further, for example, in a case of a direction board describing a destination (see reference numeral 800 in FIG. 22B and FIG. 23), the wheelchair user 203 gazes at not only one point but the entire direction board, and thus the entire region of the direction board can be regarded as the gaze position. FIG. 8C illustrates an example where the gaze position is a segment, and FIG. 8D illustrates an example where the gaze position is a region. FIG. 8C illustrates that, for example, a segment that connects the gaze position (600, 300, 0) of the chair 206A and the gaze position (350, 50, 0) of the chair 206B is recorded as a gaze position. FIG. 8D illustrates that, for example, a direction board 1 for patients who go to surgery is present on a region {the coordinates (200, 300, 100) and the coordinates (300, 300, 150)}. The two coordinates indicate two diagonal points of a rectangle. Information about departments where the wheelchair user 203 has medical examinations is recorded in the tag 205A. Further, FIG. 8E illustrates an example of gaze positions formed by points and regions. FIG. 8E illustrates, for example, a gaze position generated from the gaze position (600, 300, 0) of the chair 206A and the gaze position (200, 300, 100) of the direction board 1. The gaze position is a cubic region formed by connecting one point that is the gaze position of the chair 206A and eight vertexes of the direction board 1.

<Gaze Region Calculator 109>

When the gaze region calculator 109 receives the gaze position of the mobile object whose type is the wheelchair user 203 from the gaze position obtaining unit 108, the gaze region calculator 109 calculates a gaze region that the mobile object tends to gaze, based on the moving state (the position, the moving direction, the moving speed) of the wheelchair user 203 obtained from the moving direction calculator 106 and the gaze position. The gaze region is a region expected to be frequently gazed by the wheelchair user 203 within the predetermined amount of time after a current time. Since a case where the wheelchair user 203 stops is considered as the moving state, the moving speed is not always necessary.

The gaze region is a circular cone where an eye position (for example, positions of eyeballs) or a height of the wheelchair user 203 is set as a vertex of the circular cone and the gaze position is sets as a center of its bottom surface. Since a central visual field of a general person is 20°, an angle of the circular cone is set to 20° as one example. Further, the eye position of the wheelchair user 203 is set to a height of the eyes (for example, the position of eyeballs) (for example, 120 cm) or a height position of a vertex of a head of a general person who sits in a wheelchair as one example. Further, the height of the wheelchair user 203 is recorded as patient information in the tag 205A as one example, and the gaze region calculator 109 may estimate the height of the eyes of the wheelchair user 203 based on the height in the tag information detected by the tag reader 202. Similarly, age of the wheelchair user 203 is recorded as the patient information in the tag 205A, and the gaze region calculator 109 may estimate the height of the eyes of the wheelchair user 203 based on information about the age obtained by the tag reader 202. Further, the gaze region calculator 109 may vary the angle of the circular cone of the wheelchair user 203 based on the age. For example, in a case of an age such that the visual field becomes narrow (for example, 60 year-old or more), the angle of the circular cone may be set to 18° that is narrower than 20°. Similarly, sitting height information of the wheelchair user 203 is recorded as the patient information in the tag 205A, and the gaze region calculator 109 may estimate the height of the eyes of the wheelchair user 203 based on the sitting height information obtained by the tag reader 202.

Figure 11:
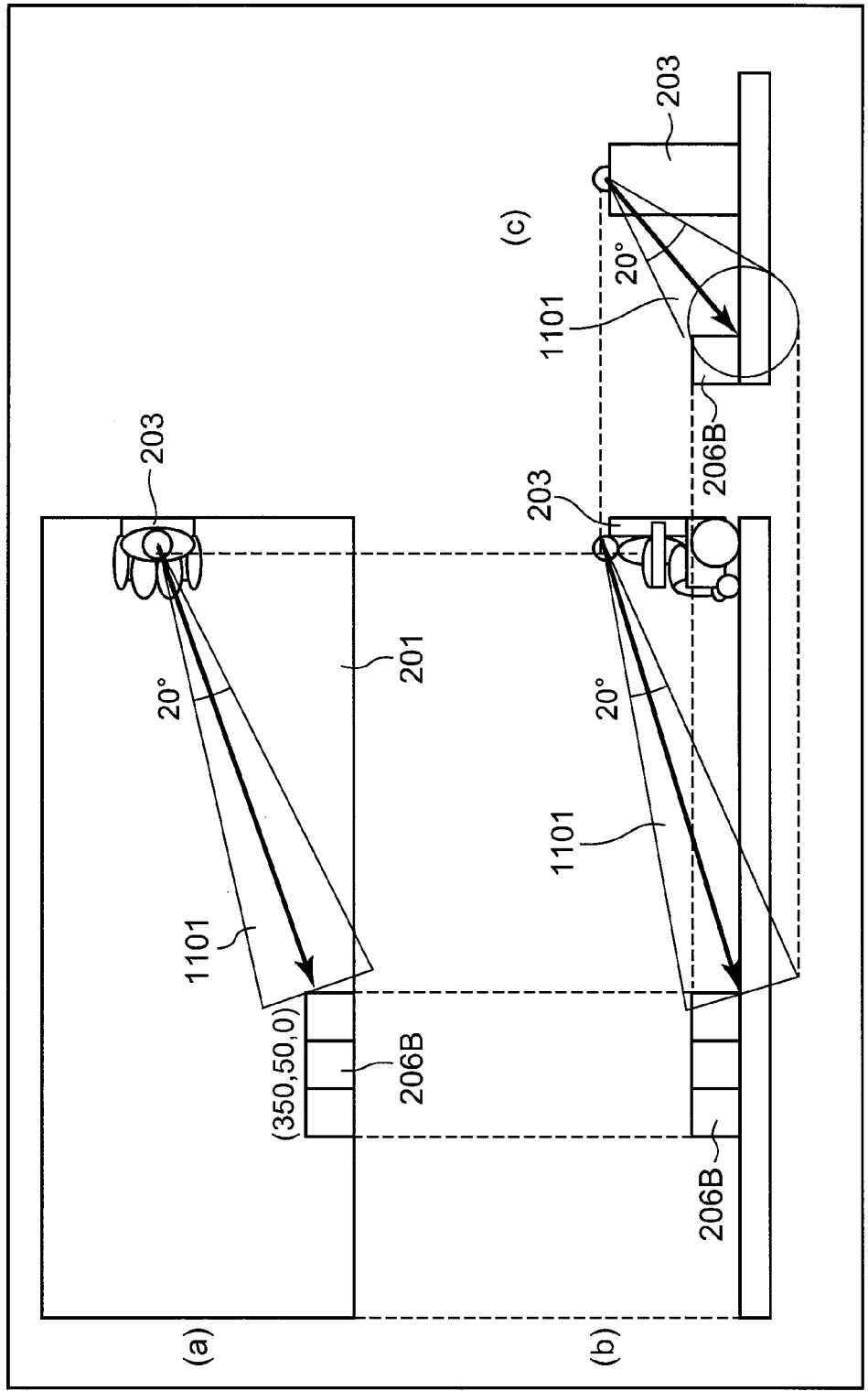
FIG. 11 is an explanatory view illustrating one example of a gaze region of a wheelchair user according to a second embodiment.

In FIG. 11, (a) to (c) are respectively a plan view, a side view, and a rear view illustrating examples of the gaze region of the wheelchair user 203. FIG. 11 illustrates a gaze region 1101 where the wheelchair user 203 can easily recognize objects other than the chair 206B also in a circumstance that the wheelchair user 203 gazes at the gaze position of the chair 206B. In FIG. 11, the chair 206A and the gaze region of the chair 206A are omitted for ease of viewing.

Figure 12:
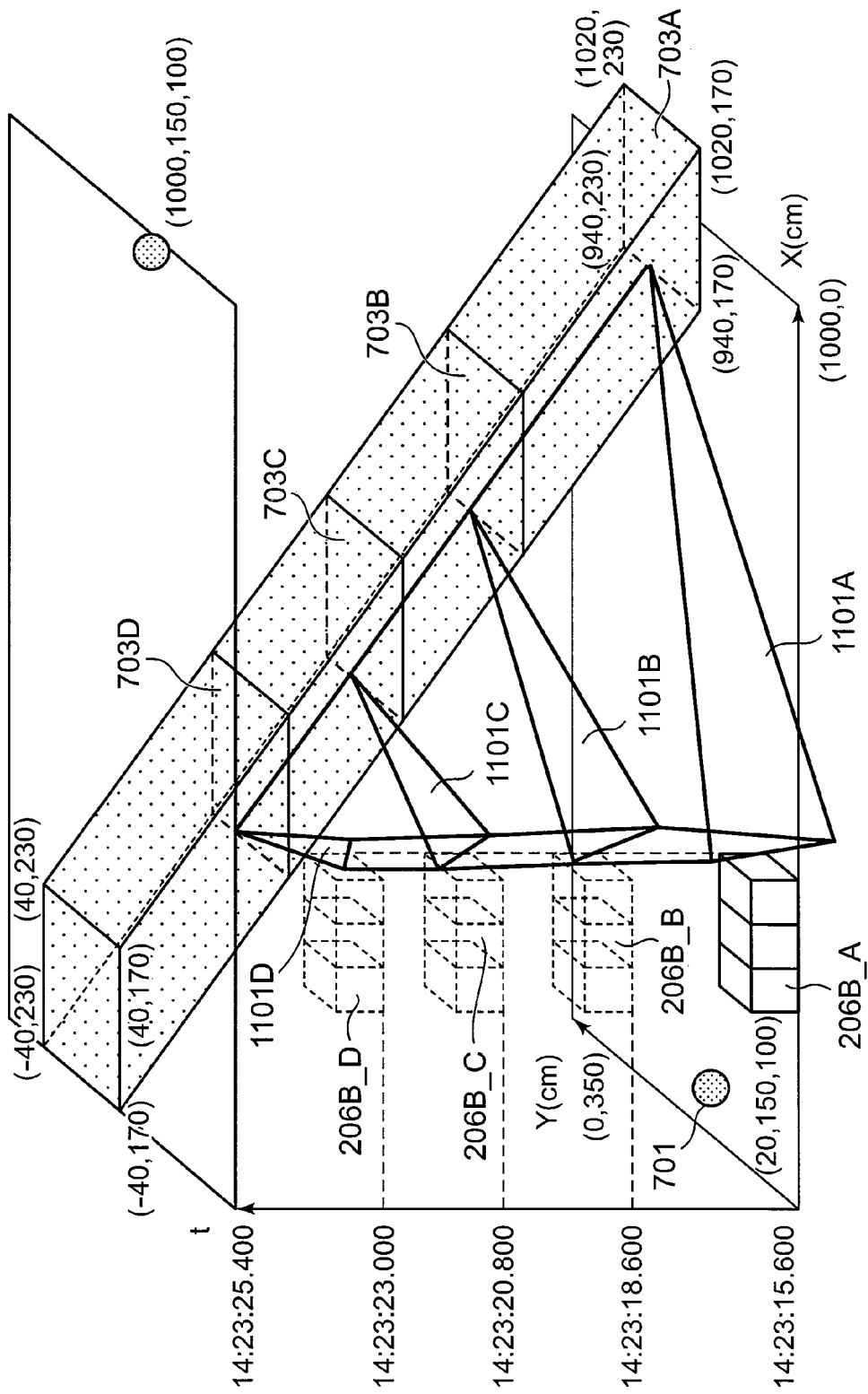
FIG. 12 is a view illustrating one example of the gaze region including a time base of the wheelchair user.

FIG. 12 illustrates an example of the gaze region of the wheelchair user 203 in a four-dimensional (x, y, z, t) configuration space (description of a z axis is omitted in the drawing) including a time base within the predetermined amount of time after the current time. The x, y, and z directions are coordinate axes of a three-dimensional space in a building, and t represents an amount of time. A reference numeral 703A represents a wheelchair user collision region 703 at the time 14:23:15.600. A reference numeral 206B_A represents chair 206B at that time, and a reference numeral 1101A represents the gaze region 1101 at that time. Further, a reference numeral 703B represents the wheelchair user collision region 703 at the time 14:23:18.600. A reference numeral 206B_B represents the chair 206B at that time. A reference numeral 1101B represents the gaze region 1101 at that time. The gaze regions 1101A to 1101D are regions when viewed as top views. The gaze regions 1101A to 1101D are not gaze regions when a height of the z-axial direction is 0 cm, and the autonomous running apparatus 204 is regarded as a point 701. For this reason, the regions are extended to the x, y, and z directions based on the shape of the autonomous running apparatus 204.

<Route Generator 110>

The route generator 110 functions as one example of the running information generator. When the route generator 110 receives the position information about the obstacle from the environment database 104, the approach time from the approach time calculator 107, and the gaze region of the mobile object whose type is the wheelchair user 203 from the gaze region calculator 109, the route generator 110 generates route information where a part of or entire part of the autonomous running apparatus 204 is included in the gaze region at a time earlier than the approach time. The route information generated by the route generator 110 is one example of running information, and is recorded in the autonomous running apparatus database 103. Further, the route generator 110 maintains the moving direction calculated by the moving direction calculator 106 and input from the moving direction calculator 106, assumes that the autonomous running apparatus 204 makes the linear uniform motion, and generates the three-dimensional configuration space including the time base (see FIG. 12).

The autonomous running apparatus 204 indicated by the point 701 may not be made to enter an extended region 702 (see FIG. 13B) and may be made to enter the gaze region 1101 at least once so as to move to the desired position (1000, 150) in the four-dimensional (x, y, z, t) space of FIG. 12. In the first embodiment, in order to simplify the description, the autonomous running apparatus 204 is considered to be a robot that makes parallel movement. When the autonomous running apparatus 204 is a robot that involves a rotational movement, a space where route search is carried out is a five-dimensional (x, y, z, t, θ) space including a rotational axis. When a moving person other than the wheelchair user 203 (for example, healthy pedestrian) is present in that space, similarly to the wheelchair user 203 or an obstacle 206, a standing column is generated as a space where the autonomous running apparatus 204 cannot run in the configuration space.

As a specific method for generating a route, for example, the Dijkstra method can be used. Details of the Dijkstra method will be described later.

<Running Controller 113>

The running controller 113 is composed of, for example, the speed command value converter 111 and the wheel controller 112.

The speed command value converter 111 functions as one example of a running information obtaining unit. The speed command value converter 111 obtains the route information (speed information included therein) recorded in the autonomous running apparatus database 103, and calculates a speed command value of the autonomous running apparatus 204 based on the obtained route information. When the autonomous running apparatus 204 is a robot that moves with two wheels, the speed command value converter 111 calculates directions (forward rotation or reverse rotations) and speeds at which the respective wheels 115 (see FIG. 26) are rotated by the driving device 114 such as motors.

The wheel controller 112 functions as one example of a driving device controller. The wheel controller 112 controls the driving device 114 based on the rotational direction and the rotational speed of each of the wheels calculated by the speed command value converter 111 so that the wheels 115 of the autonomous running apparatus 204 are driven.

<Operation>

A rough flow of the operations of the components of the running information generating apparatus 100 having the above constitution is first described below with reference to FIG. 14, and then specific operations are described with reference to FIG. 15.

<Step S1>

Figure 14:
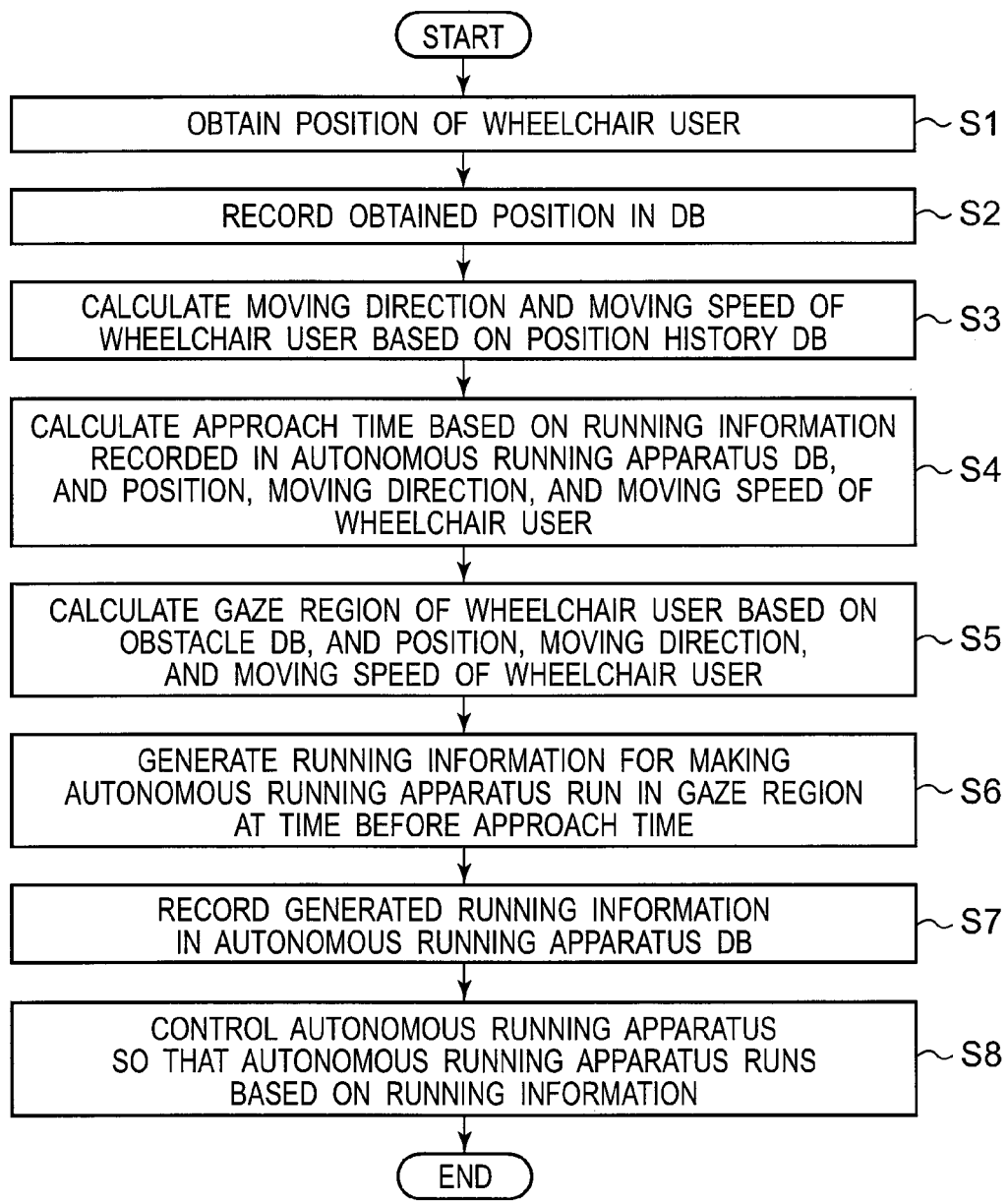
FIG. 14 is a flowchart illustrating a rough flow of generation of running information in the running information generating apparatus according to the first embodiment.

The observing apparatus 101 as one example of the position obtaining unit obtains the position of the wheelchair user 203 at every predetermined time at step S1 in FIG. 14.

<Step S2>

Then, the observation information processor 105 records the position of the wheelchair user 203 obtained by the observing apparatus 101 in the position history database 102 at step S2.

<Step S3>

Then, the moving direction calculator 106 as one example of the movement information calculator calculates the moving direction and the moving speed of the wheelchair user 203 based on the information recorded in the position history database 102 at step S3.

<Step S4>

Then, the approach time calculator 107 calculates a time when the autonomous running apparatus 204 and the wheelchair user 203 approach to each other within the predetermined distance based on the running information recorded in the autonomous running apparatus database 103, the position of the wheelchair user 203 recorded in the position history database 102, and the moving direction and the moving speed of the wheelchair user 203 calculated by the moving direction calculator 106 at step S4.

<Step S5>

Then, the gaze position obtaining unit 108 obtains the gaze position of the wheelchair user 203 based on the environment database 104 as one example of the obstacle database, the position of the wheelchair user 203 recorded in the position history database 102, and the moving direction and the moving speed of the wheelchair user 203 calculated by the moving direction calculator 106. The gaze region calculator 109 calculates the gaze region based on the obtained gaze position, and the position and the moving direction of the moving person in the wheelchair at step S5.

<Step S6>

Then, the route generator 110 generates a route as the running information where the autonomous running apparatus 204 runs within the gaze region at a time before the approach time based on the position information about the obstacles from the environment database 104, the approach time from the approach time calculator 107, and the gaze region of the mobile object whose type is the wheelchair user 203 from the gaze region calculator 109 at step S6.

<Step S7>

Then, the route generator 110 records the running information generated by the route generator 110 in the autonomous running apparatus database 103 at step S7.

<Step S8>

Then, the running controller 113 controls the autonomous running apparatus 204 so that the autonomous running apparatus 204 runs based on the running information recorded in the autonomous running apparatus database 103 at step S8.

The above is an outline of the operation for generating running information in the running information generating apparatus 100.

Figure 15:
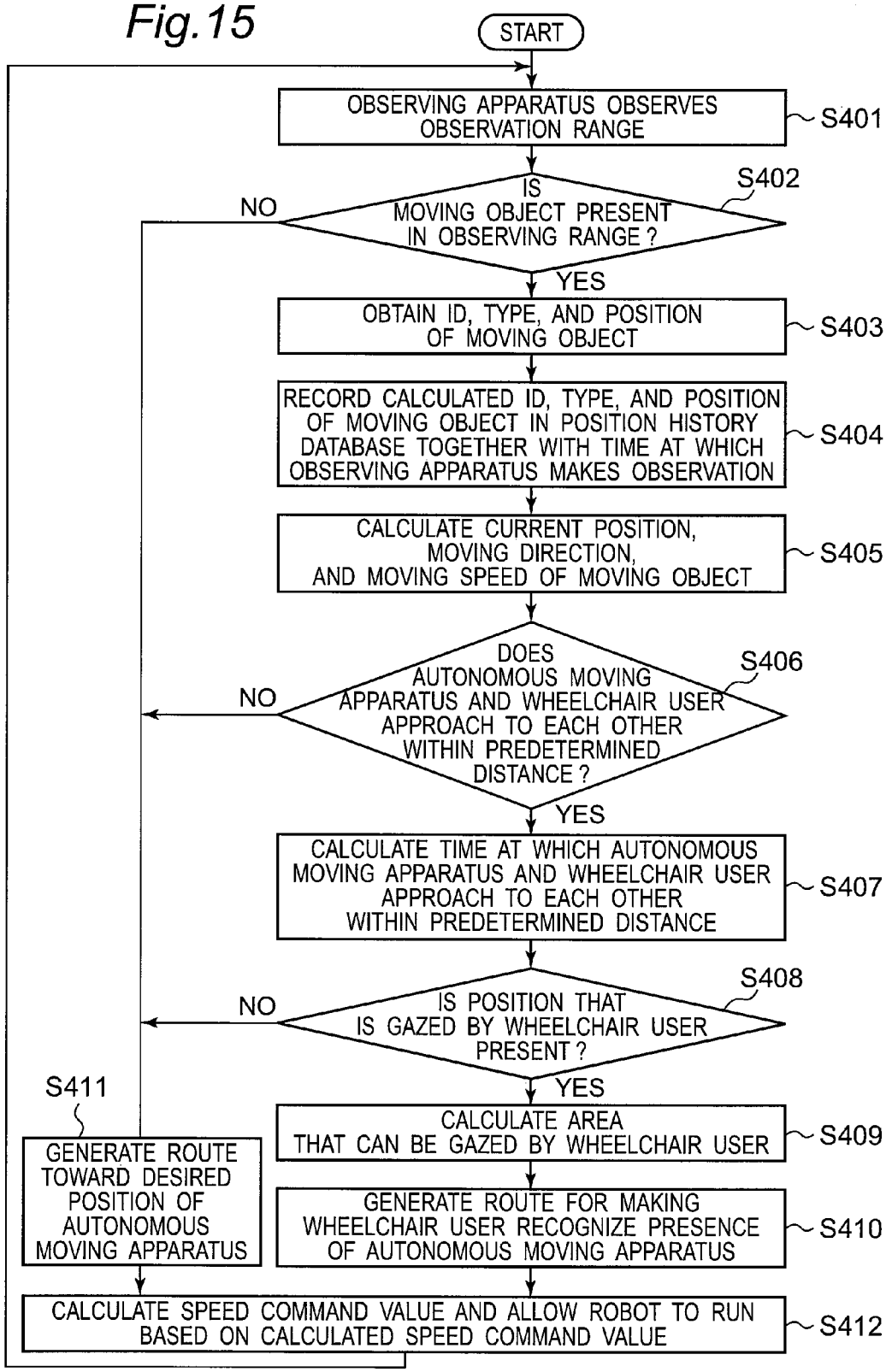
FIG. 15 is a flowchart illustrating an entire process of the running information generating apparatus according to the first embodiment.

FIG. 15 is a flowchart illustrating the operation for generating the running information about the running information generating apparatus 100 according to the first embodiment in detail.

<Step S401> (Corresponding to the Previous Step S1)

The tag reader 202 as one example of the observing apparatus 101 detects the tag 205 present in the passage 201 as one example of an observation range. It is assumed that the tag 205R owned by the autonomous running apparatus 204 and the tag 205A owned by the wheelchair user 203 are detected.

<Step S402> (Corresponding to the Previous Step S1)

Then, the observing apparatus 101 (specifically, the tag reader 202) determines whether the mobile object present within the observation range of the tag reader 202 is detected. Since the tag reader 202 detects the tag 205R owned by the autonomous running apparatus 204 and the tag 205A owned by the wheelchair user 203, the running information generating process goes to step S403. If the tag reader 202 does not detect the tag 205, the running information generating process goes to step S411.

<Step S403> (Corresponding to the Previous Step S1)

Then, the observation information processor 105 determines the ID and the type of the mobile object having the tag 205 based on the tag information recorded in the tag 205 detected by the tag reader 202. Further, since distances between the antennas 202A and the tag 205 can be obtained based on amount of times required for the antennas 202A to detect the tag 205, when the three or more antennas 202A detect the tag 205, the position of the tag 205 can be calculated by the observation information processor 105 based on a principle of three-point measurement, and the position is set as the position of the mobile object having the tag 205 in the observation information processor 105.

<Step S404> (Corresponding to the Previous Step S2)

Then, the observation information processor 105 records the obtained ID, type and position of the mobile object as well as a time at which the tag reader 202 detects the tag 205, in the position history database 102. In one example, the autonomous running apparatus 204 whose mobile object ID is TAG_001 is present on the coordinates (0, 150), and the wheelchair user 203 whose mobile object ID is TAG_002 is present on the coordinates (1000, 200) at the time 14:23:15.400 in the position history database 102 of FIG. 7.

<Step S405> (Corresponding to the Previous Step S3)

Then, the moving direction calculator 106 obtains at least the position of the mobile object whose type is the wheelchair user 203 in the last observation in the tag reader 202 and calculates the moving direction and the moving speed, based on the information from the position history database 102.

In FIG. 7 as one example, as to the positions of the mobile objects in the last observation in the tag reader 202, the autonomous running apparatus 204 whose mobile object ID is TAG_001 is present on the coordinates (20, 150) and the wheelchair user 203 whose mobile object ID is TAG_002 is present on the coordinates (980, 200) at 14:23:15.600. The moving direction calculator 106 obtains the positions (coordinates) from the position history database 102. Further, the moving direction calculator 106 calculates the moving direction and the moving speed of the mobile object based on the history of the positions of the mobile object recorded in the position history database 102. In FIG. 7, when a current time is 14:23:15.600, the autonomous running apparatus 204 whose mobile object ID is TAG_001 moves in the +X coordinate direction at a speed of 1 meter per second, and the wheelchair user 203 whose mobile object ID is TAG_002 moves in the −X coordinate direction at a speed of 1 meter per second. The moving speed can be, for example, an average speed in the used observation information of the history. Further, the moving direction can be obtained by using, for example, the least squares method. In the example of the position history database 102 shown in FIG. 7, a number of histories is three, but a number of histories used for calculating the moving speed and the moving direction of the mobile object may be at least two.

<Step S406> (Corresponding to the Previous Step S4)

Then, the approach time calculator 107 determines whether the autonomous running apparatus 204 and the wheelchair user 203 approach to each other within the predetermined distance in the predetermined amount of time after the current time (the time at which the tag reader 202 makes the last observation), based on the running information recorded in the autonomous running apparatus database 103, and the position, the moving direction, and the moving speed of the wheelchair user 203. When the approach time calculator 107 determines that the autonomous running apparatus 204 and the wheelchair user 203 approach to each other within the predetermined distance, the approach time calculator 107 calculates the approach time at which the autonomous running apparatus 204 and the wheelchair user 203 approach to each other within the predetermined distance. At this time, it is considered that the autonomous running apparatus 204 moves in accordance with the route information recorded in the autonomous running apparatus database 103, and the wheelchair user 203 maintains the moving speed and the moving direction calculated by the moving direction calculator 106 so as to make linear uniform motion. On referring to the running information recorded in the autonomous running apparatus database 103 at step S406, a running route between the current position and the desired position is generated by the route generator 110 and is recorded in the autonomous running apparatus database 103 at a time point when the autonomous running apparatus 204 starts to run (in other words, a time point before the wheelchair user 203 is detected). That is to say, the route generator 110 generates the route also while the wheelchair user 203 is not detected. This is because it is preferable that when the autonomous running apparatus 204 cannot run with the speed command value due to an influence of road surface circumstances or wind, the running route is again adjusted. If the autonomous running apparatus 204 is operated in an environment where an error hardly occurs in the running of the autonomous running apparatus 204, the route may be generated once while the wheelchair user 203 is not detected.

As described above, an example of the method for determining whether the approach within the predetermined distance is made using the approach time calculator 107 is a method for creating a configuration space in the approach time calculator 107, and then determining whether a locus of the autonomous running apparatus 204 is included in a region formed by the wheelchair user 203 in a space including a time base using the approach time calculator 107.

Figure 13A:
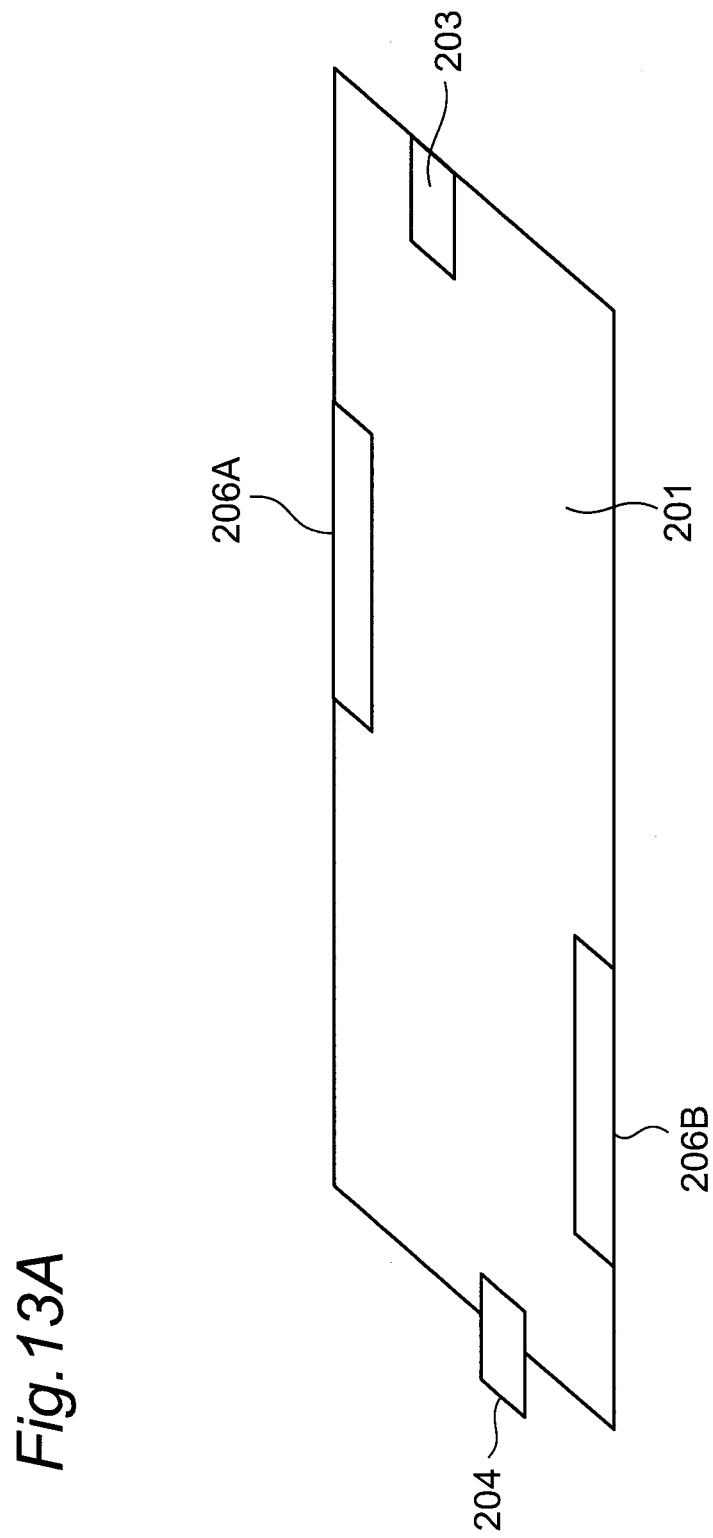
FIG. 13A is a view before creation of a configuration illustrating one example of a configuration space.

The configuration space is a method in which a space (dimension) is extended; the autonomous running apparatus 204 is regarded as a point, and thus route planning is facilitated. This is frequently used for route planning of robots. FIG. 13A and FIG. 13B illustrate examples of the configuration space. FIG. 13A illustrates an arrangement of the obstacle and the autonomous running apparatus 204 in the passage 201 before the creation of the configuration space, and FIG. 13B illustrates a circumstance after the creation of the configuration space. The autonomous running apparatus 204 is expressed as the point 701, and the peripheral obstacles are extended by the size of the autonomous running apparatus 204 (the extended region 702). The extended region 702 formed by the wheelchair user 203 is called the wheelchair user collision region 703 (including the region where the wheelchair user 203 is present). This means that when the point 701 enters the wheelchair user collision region 703, the autonomous running apparatus 204 collides with the wheelchair user 203.

When the autonomous running apparatus 204 and the wheelchair user 203 approach to and pass each other, and the wheelchair user 203 does not recognize the presence of the autonomous running apparatus 204 and abruptly changes the direction, the autonomous running apparatus 204 might collide with the wheelchair user 203.

For this reason, an allowance distance that can prevent the collision should be set so that the autonomous running apparatus 204 can make emergency stop, even when the wheelchair user 203 abruptly changes the direction. This allowance distance is set to be the predetermined distance in the approach time calculator 107. In the first embodiment, as one example, the predetermined distance is 50 cm in a front-back direction and a right-left direction from the wheelchair user 203. The extended region formed by the wheelchair user 203 where the predetermined distance is taken into consideration is called a wheelchair user danger region 704 (the wheelchair user danger region 704 includes the wheelchair user collision region 703). Further, the predetermined amount of time can be set to be, for example, a time at which the autonomous running apparatus 204 arrives at a next relay position or the desired position in the approach time calculator 107. If a next relay position is directly before person's eyes, the predetermined amount of time may be set to be a time of arrival at a further next relay position or the desired position in the approach time calculator 107. In the first embodiment, for example, the time of the arrival at the desired position is set as the predetermined time, and the approach time calculator 107 determines whether the autonomous running apparatus 204 and the wheelchair user 203 approach to each other within the predetermined distance before the time 14:23:25.400. Further, the current time means the time at which the tag reader 202 makes the last observation, and the current time is 14:23:15.600 in the example of the position history database 102 shown in FIG. 7.

Figure 16:
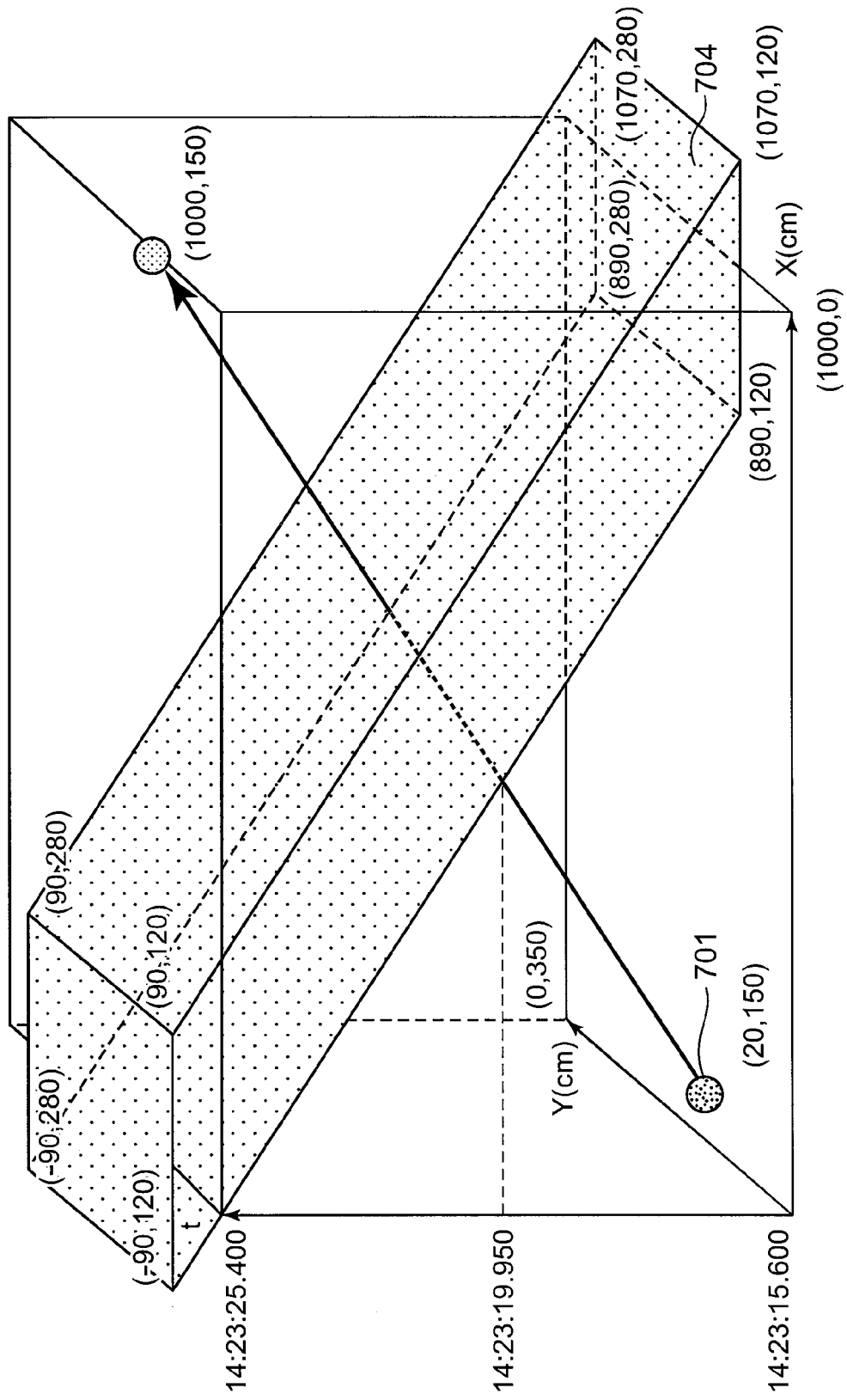
FIG. 16 is a view illustrating one example of the configuration space including the time base.

FIG. 16 is a view that a time base t is added, and the point 701 of the autonomous running apparatus 204 and the wheelchair user danger region 704 move in a three-dimensional space of (x, y, t). In FIG. 16, the extended region 702 formed by the chair 206 is omitted for ease of viewing. When even a part of the locus of the point 701 representing the autonomous running apparatus 204 is included in a solid representing the wheelchair user danger region 704 in the three-dimensional space, the approach time calculator 107 determines that the autonomous running apparatus 204 and the wheelchair user 203 approach to each other within the predetermined distance. When the approach time calculator 107 determines that the autonomous running apparatus 204 and the wheelchair user 203 approach to each other within the predetermined distance, the running information generating process goes to step S407. When the approach time calculator 107 determines that the autonomous running apparatus 204 and the wheelchair user 203 do not approach to each other within the predetermined distance, the running information generating process goes to step S411. As a mobile object avoiding technique for a robot as one example of the autonomous running apparatus 204 where the time base t is taken into consideration, for example, a technique disclosed in Non-Patent Literature 2 ("Planning and navigation by a mobile robot in the presence of multiple moving obstacles and their velocities" by Takashi Tsubouchi, Tomohide Naniwa, Suguru Arimoto, Journal of Robotic Society of Japan, col. 12, No. 7, 1994) is known.

<Step S407> (Corresponding to the Previous Step S4)

Then, when the approach time calculator 107 determines that the autonomous running apparatus 204 and the wheelchair user 203 approach to each other within the predetermined distance, the approach time calculator 107 calculates a time at which the autonomous running apparatus 204 and the wheelchair user 203 first approach to each other. The approach time calculator 107 may obtain the locus of the point 701 of the autonomous running apparatus 204 and a contact point of the wheelchair user danger region 704 in the three-dimensional space shown in FIG. 16. When a plurality of contact points are present, a time of the contact at which the time t is the earliest is set as the time at which the autonomous running apparatus 204 and the wheelchair user 203 first approach to each other within the predetermined distance.

The example shown in FIG. 16 shows that the autonomous running apparatus 204 and the wheelchair user 203 first approach to each other within the predetermined distance at 14:23:19.950.

<Step S408> (Corresponding to the Previous Step S5)

Then, only when the approach time is output from the approach time calculator 107, the gaze position obtaining unit 108 obtains the gaze position that is expected to be frequently gazed by the wheelchair user 203 in the predetermined amount of time after the current time based on the moving state (the position, the moving direction, and the moving speed) of the wheelchair user 203 output from the moving direction calculator 106 and the obstacle information recorded in the environment database 104, and the running information generating process goes to step S409. As described above, FIG. 8A and FIG. 8B illustrate examples of the environment database 104. When the approach time is not output from the approach time calculator 107, the gaze position obtaining unit 108 does not obtain the gaze position, and the running information generating process goes to step S411.

<Step S409> (Corresponding to the Previous Step S5)

Then, the gaze region calculator 109 calculates a gaze region that is expected to be frequently gazed by the wheelchair user 203 in the predetermined amount of time after the current time based on the moving state of the wheelchair user 203 from the moving direction calculator 106 and the gaze position from the gaze position obtaining unit 108.

<Step S410> (Corresponding to the Previous Steps S6 and S7)

Then, the route generator 110 generates the route information such that at least a part of the autonomous running apparatus 204 is included in the gaze region at a time earlier than the approach time and in a predetermined amount of time based on the position information about the obstacles from the environment database 104, the approach time from the approach time calculator 107, and the gaze region of the mobile object whose type is the wheelchair user 203 from the gaze region calculator 109, and records the route information in the autonomous running apparatus database 103.

Figure 17A:
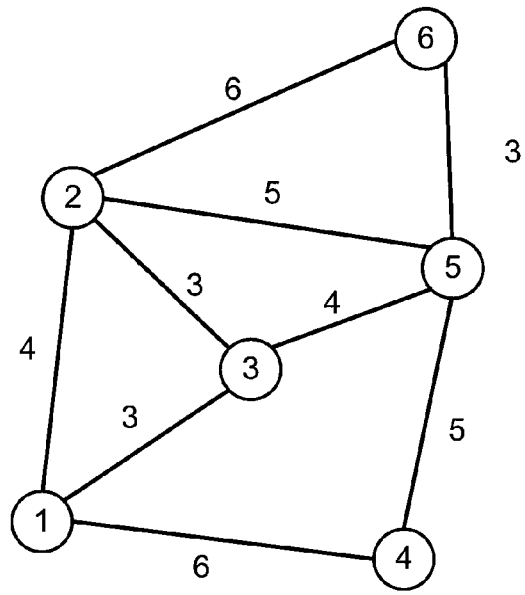
FIG. 17A is a view illustrating generation of the running route by a Dijkstra method.
Figure 17B:
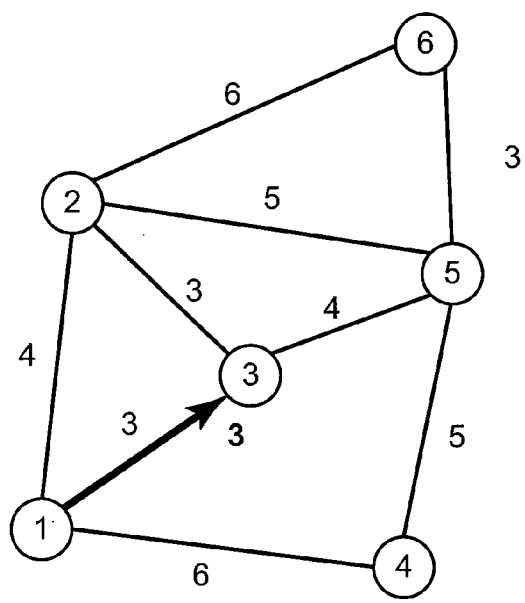
FIG. 17B is a view illustrating generation of the running route by a Dijkstra method.
Figure 17C:
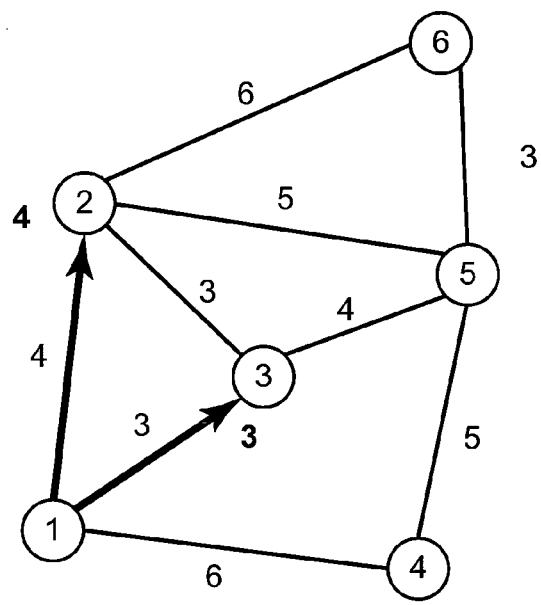
FIG. 17C is a view illustrating generation of the running route by a Dijkstra method.
Figure 17D:
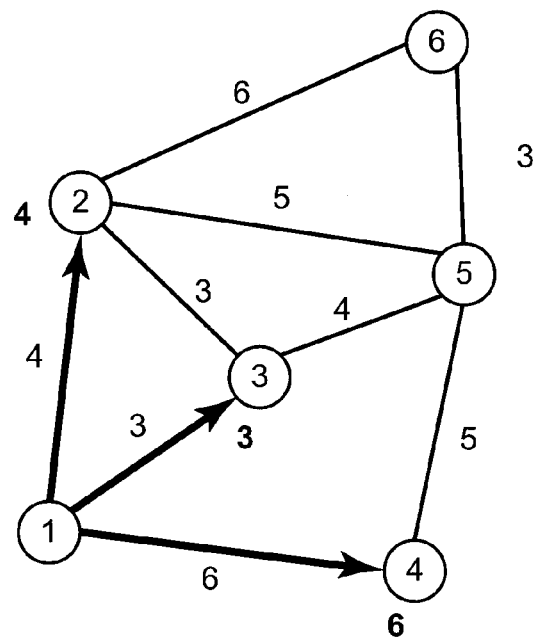
FIG. 17D is a view illustrating generation of the running route by a Dijkstra method.
Figure 17E:
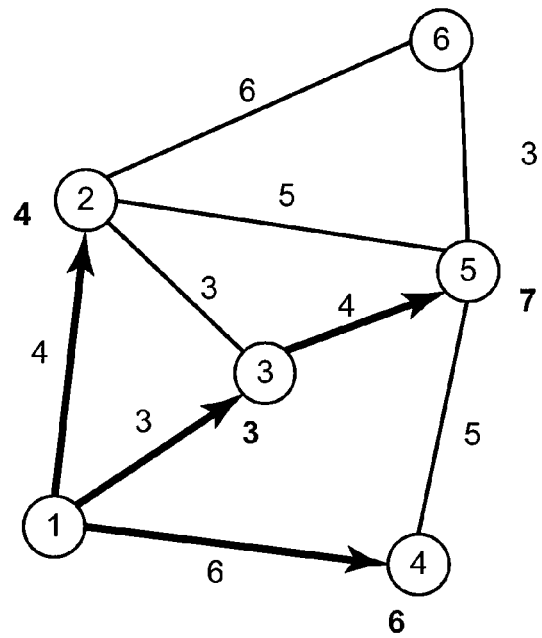
FIG. 17E is a view illustrating generation of the running route by a Dijkstra method.
Figure 17F:
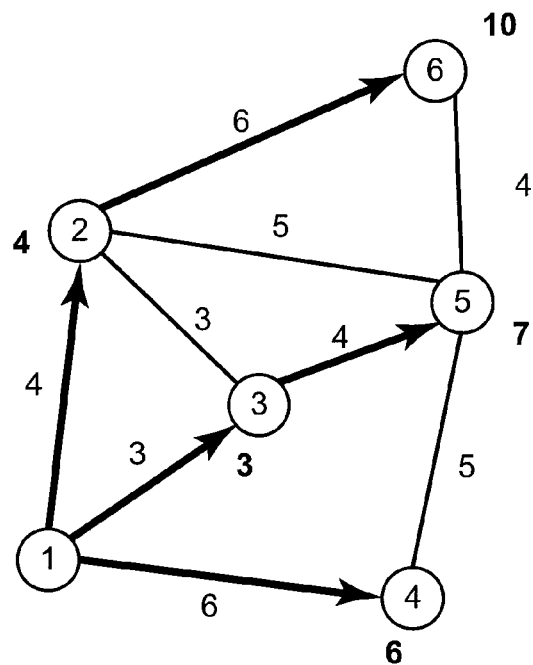
FIG. 17F is a view illustrating generation of the running route by a Dijkstra method.

As described above, as the specific route generating method, for example, the Dijkstra method is used. The Dijkstra method is one method for solving a shortest route search problem on a weight graph. FIG. 17A to FIG. 17F illustrate an example of the shortest route search using the Dijkstra method. FIG. 17A is the weighted graph to be solved. In the graph, six nodes are arranged, and when movement between the nodes is enabled, the nodes are connected by arcs. Numerical values displayed on the arcs are weights. A shortest route from the node 1 to the node 6 is obtained by the route generator 110 this time. The route generator 110 first searches for a node where the movement from a node 1 is enabled by the smallest weight. As a result, it is found that movement to a node 3 is enabled by a weight 3 (FIG. 17B). Another node where the movement from the node 1 is enabled by the smallest weight is searched for. As a result, it is found that the movement to a node 2 is enabled by a weight 4 (FIG. 17C). Similarly, a still another node where the movement from the node 1 is enabled by the smallest weight is searched for. As a result, it is found that the movement to the node 6 is enabled by a weight 6 (FIG. 17D). A node where the moving from the node 3 is enabled by the smallest weight is searched for based on the node 3 where the movement from the node 1 is enabled. As a result, it is found that the movement to a node 5 is enabled by a weight 4 (FIG. 17E). The process is repeated so that a shortest route (in other words, a route where the weight is the smallest) from the node 1 to a node 6 is searched for. As a result, the weight has the smallest value obtained by 4+6=10 on the route from the node 1 to the node 6 via the node 2. Therefore, a route with the smallest weight for arrival at the node 6 from the node 1 can be finally generated (FIG. 17F).

In a specific method to which the Dijkstra method is applied in the first embodiment, the route generator 110 first sets a node. The route generator 110 divides the four-dimensional space into a mesh pattern (intersection points of the mesh are nodes, and arcs are between the nodes). A gap of the mesh is determined by the route generator 110 based on the speed information about the autonomous running apparatus 204 recorded in the autonomous running apparatus database 103. For example, when the speed of the autonomous running apparatus 204 is slow, the mesh pattern is formed so that a gap between the time bases are wide and a gap between the x and y axes is narrow. If the mesh is formed so that the gap between the time bases is 1 second, and the gap between the x and y axes is 200 cm, the autonomous running apparatus 204 should move at a speed of 200 cm/s or more to move between nodes. Since a maximum speed of the autonomous running apparatus 204 is 100 cm/s, for example, in the first embodiment, a solution of the route cannot be found by using the Dijkstra method. The node setting method is not limited to this, and for example, a Voronoi diagram may be used. The Voronoi diagram is a diagram composed of a part of a bisecting normal of a segment connecting adjacent two points in a plurality of point groups, and the segment can be regarded as the arc, and the intersection point of the segment can be regarded as the node.

The route generator 110 sets a relay position for making the autonomous running apparatus 204 enter the gaze region 1101. As to the coordinates (x, y) of the relay position, as one example, the route generator 110 sets the relay position within the gaze region 110 separated from the wheelchair user 203 after the safety of the wheelchair user 203 taken into consideration.

A z coordinate of the relay position is a position of the height of the point 701 of the autonomous running apparatus 204 within gaze region 110 (in the first embodiment, for example, 100 cm).

For example, the route generator 110 sets the time t of the relay position to a time of arrival at the coordinates (x, y, z) set by the autonomous running apparatus 204 in gaze region 110, based on the speed information of the autonomous running apparatus 204 recorded in the autonomous running apparatus database 103.

Then, the route generator 110, then, sets an initial node. A position of the initial node is a position (20, 150, 100) of the point 701 of the autonomous running apparatus 204 at a current time.

The route generator 110 may set a desired node. A position of the desired node is the desired position (100, 150, 100).

Since a route to be newly generated passes the gaze region 1101, the route generator 110 sets the time t of the desired node longer. It is considered as one example that an amount of time that is 5 seconds after an amount of time required for the autonomous running apparatus 204 making straight line movement to the desired position is set as the time t of the desired node. When the route generator 110 finishes the setting of the initial node, the relay node, and the desired node, the route generator 110 first obtains a route from the initial node to the relay node using the Dijkstra method. When the route generator 110 obtains the route, the route generator 110 obtains a route from the relay node to the desired node using the Dijkstra method. As a result, the route generator 110 can obtain a route from the initial node to the desired node, namely, a route along which the autonomous running apparatus 204 can be made to move to the desired position via the gaze region 1101 at a current time.

Since the Dijkstra method is a method for obtaining a shortest route through the search for all the possibilities, the number of the relay nodes and the number of the desired nodes are not limited to one, and a plurality of them may be provided. Also in such a case, the route generator 110 selects a shortest route in a plurality of route candidates passing the relay nodes and arriving at the desired node(s).

When the autonomous running apparatus 204 cannot make an upward and downward motion, the point 701 of the autonomous running apparatus 204 cannot be moved in the z-axial direction. This means that the movement between nodes that involves the movement to the z-axial direction cannot be made by using the Dijkstra method. That is to say, even when the relay position or the desired position is set on a z position other than the height of the point 701 of the autonomous running apparatus 204, a solution of the route cannot be found.

When the gaze region 1101 is present at the height of the point 701, the solution of the route is likely to be found. On the other hand, when the gaze region 1101 is not present at the height of the point 701, the solution of the route is not found. It is assumed that the route generator 110 refers to the obstacle information recorded in the environment database 104, and the route generator 110 checks that no obstacle is present above the autonomous running apparatus 204. In this case, for example, it is considered that the route generator 110 allows the point 701 to move in the z-axial direction within a range of the height of the autonomous running apparatus 204. As a result, even when the relay position or the desired position is set on the z position other than the height of the point 701, the route generator 110 can find the solution of the route.

When the route generator 110 generates the route of the autonomous running apparatus 204 in a multi-dimensional space and a problem of calculation amount arises, for example, a route generating method such as RRTs (Rapidly-exploring Random Trees) can be used. The route generating method is a method for generating nodes on random positions from an initial node, and only the necessary number of nodes is sequentially generated. Thus, an increase in the calculation amount can be suppressed. This is disclosed in Non-Patent Literature 3 (Steven M. Lavalle, James J. Kuffner: Randomized Kinodynamic Planning. Robotics and Automation, 1999. Proceedings. 1999 IEEE International Conference on, pp 473-479, vol. 1). The route generating method is not limited to this, and a probabilistic roadmap method or A* algorithm, for example, may be used as another route generating method.

Figure 18A:
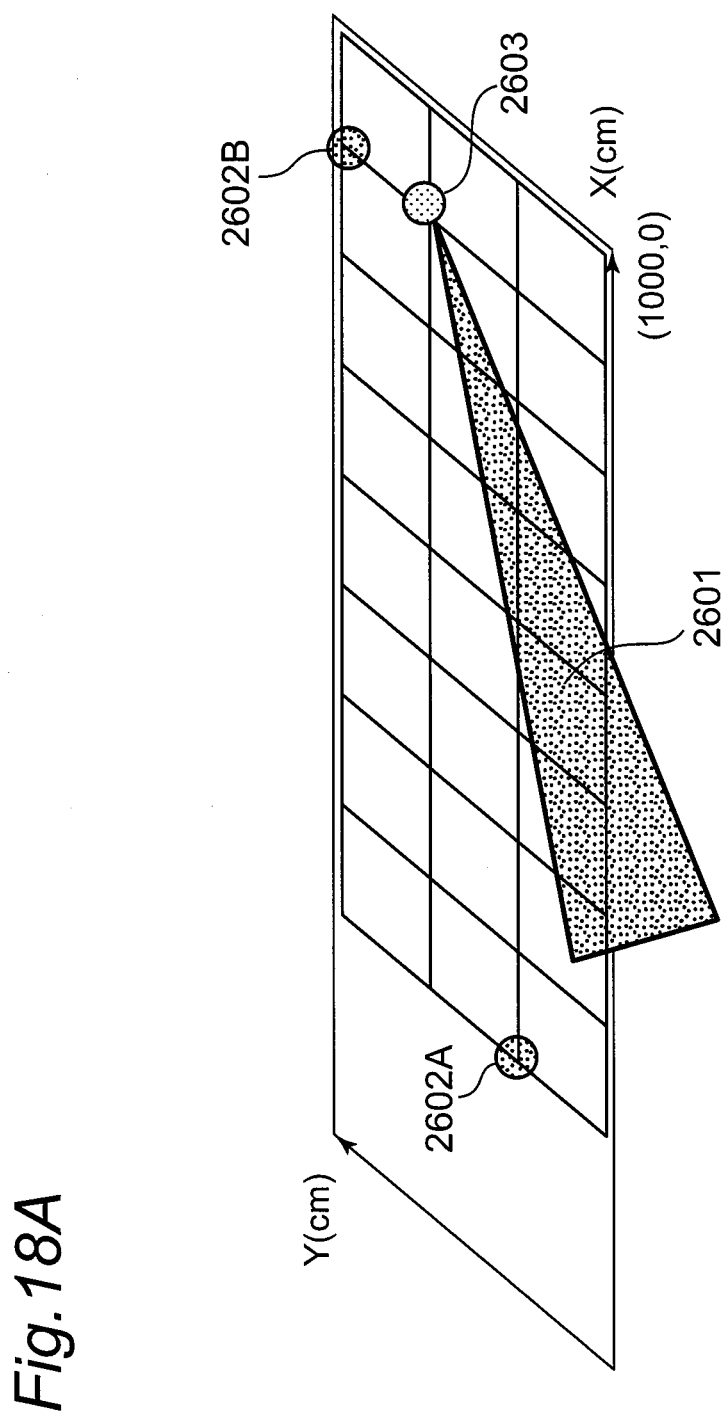
FIG. 18A is a view illustrating the gaze region in an example where a route is generated by using an A* algorithm in a route generator.
Figure 18B:
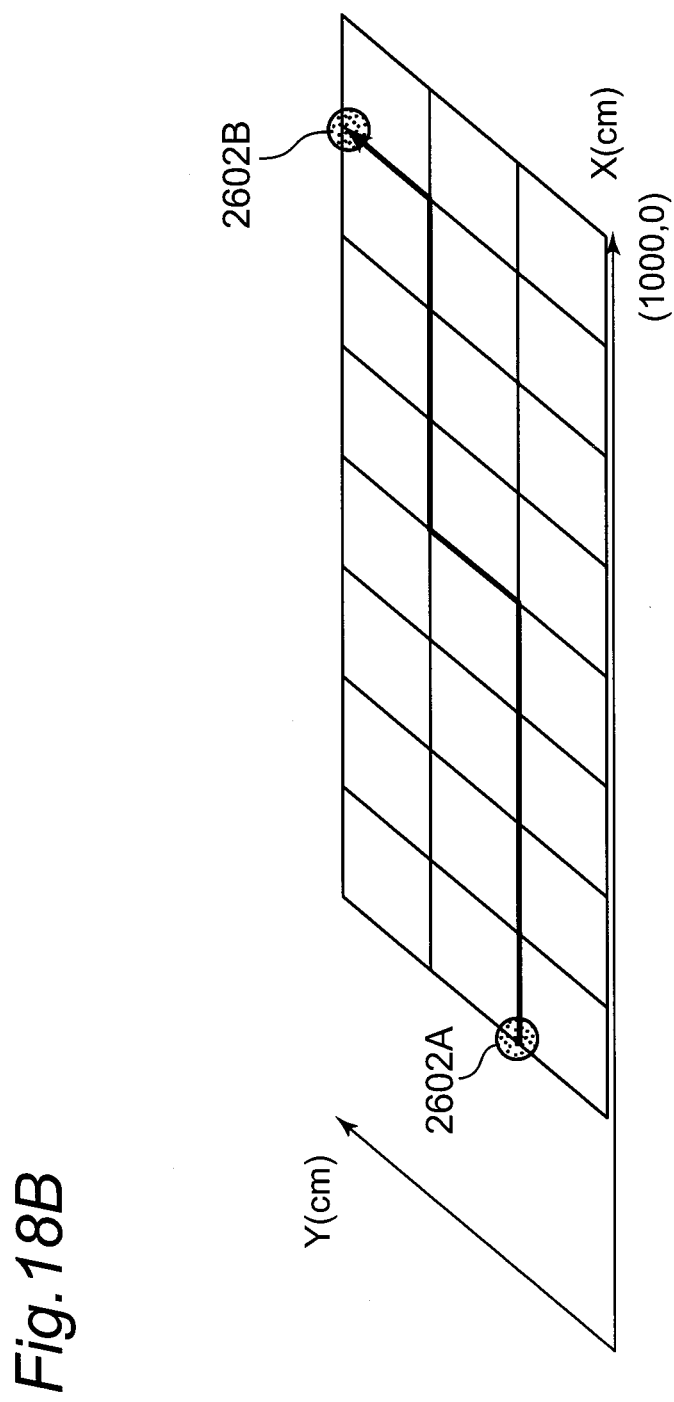
FIG. 18B is a view illustrating a shortest route generated in the example where the route is generated by using the A* algorithm in the route generator.
Figure 18C:
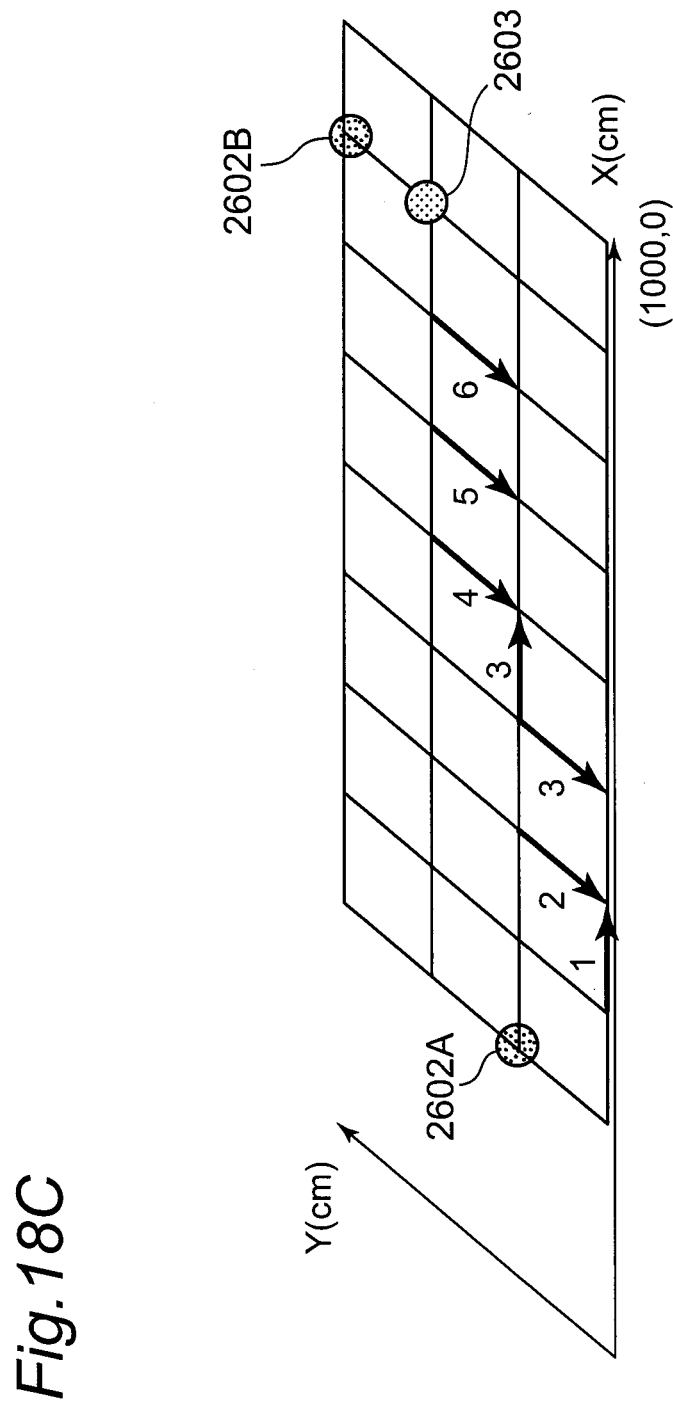
FIG. 18C is a view for describing weighting in view of a risk when the autonomous running apparatus enters the gaze region in the example where the route is generated by using the A* algorithm in the route generator.
Figure 18D:
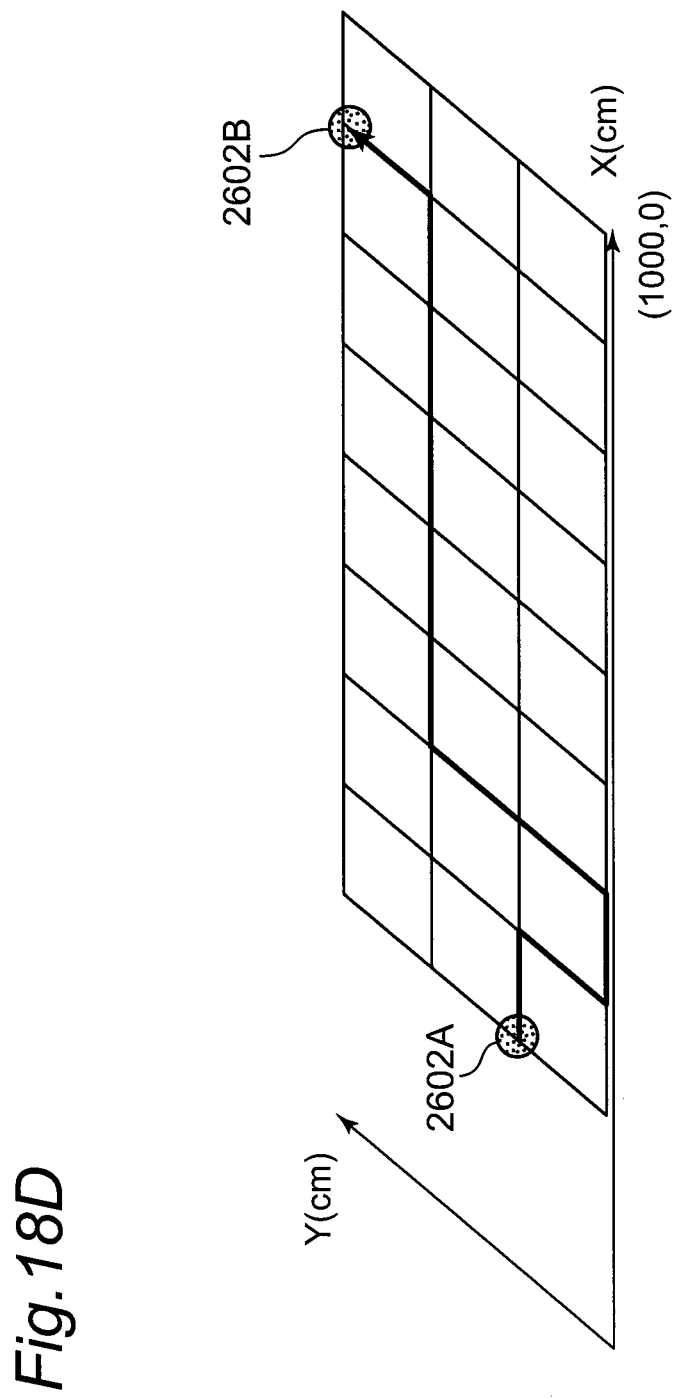
FIG. 18D is a view illustrating a route to which the risk is added in the example where the route is generated by using the A* algorithm in the route generator.

An example where the route generator 110 uses the A* algorithm and generates a route is described with reference to FIG. 18A to FIG. 18D. FIG. 18A illustrates a gaze region 2601 generated in a manner that the wheelchair user 203 gazes at a still obstacle (the illustration of the still obstacle is omitted), a current position 2602A of the autonomous running apparatus 204 (a position at a time when the observing apparatus 101 makes the last observation), the desired position 2602B of the autonomous running apparatus 204, and a current position 2603 of the wheelchair user 203 (a position at a time when the observing apparatus 101 makes the last observation). When the autonomous running apparatus 204 once enters the gaze region 2601 and the autonomous running apparatus 204 generates a route to the desired position 2602B using the Dijkstra method, a shortest route shown in FIG. 18B is generated (for simple description, the time base is omitted. That is to say, the wheelchair user 2603 stops). In the A* algorithm, a weight used for movement of an arc can be defined for each arc. For example, when the running is limited by any situation such that the running is strained due to a steep slope or the careful running is necessary due to installation of valuables, the arcs can be weighted. As a result, a route that is not just the shortest but is optimum for the circumferential condition can be generated by the route generator 110. FIG. 18C illustrates a state that a risk incurred when the autonomous running apparatus 204 enters the gaze region 2601 is added as a weight. For example, since the wheelchair user 2603 is likely to be surprised at sudden appearance of the autonomous running apparatus 204, a large weight is set on the arc that enters the gaze region 2601 on a position close to the wheelchair user 2603. Further, since the wheelchair user 2603 is unlikely to be surprised at the appearance of the autonomous running apparatus 204, a small weight is set on the arc that enters the gaze region 2601 on a position far from the wheelchair user 2603. When the route generator 110 generates the route to which such a weight is added, the route generator 110 can generate a running route of the autonomous running apparatus 204 shown in FIG. 18D that has a little longer running distance but is safer for the wheelchair user 203. In the above description, the weight is set in view of the risk of the wheelchair user 203, but the weight may be set in view of a risk of contact between the autonomous running apparatus 204 and the obstacles. Further, the weight may be set in view of both the risk of the wheelchair user 203 and a possibility of the contact between the autonomous running apparatus 204 and the obstacles. For example, when a distance between the autonomous running apparatus 204 and the wheelchair user 203 is secured enough for the wheelchair user 203 to recognize the presence of the autonomous running apparatus 204 in plenty of time even if the autonomous running apparatus 204 decelerates to enter the gaze region 2601, the route generator 110 can also generate a route such that the autonomous running apparatus 204 decelerates to enter the gaze region 2601 in order to reduce the possibility of the contact with the obstacles. Further, in another example, when the distance between the autonomous running apparatus 204 and the mobile object (the wheelchair user 203) is small (small positional relationship), the autonomous running apparatus 204 weights the moving arc (between nodes), this arc can be made to be hardly selected as a route to be generated. More specifically, for example, a numerical value obtained by weighting an actual distance is set as a virtual distance, and a route having the shortest virtual distance is selected by the route generator 110. The weight is determined based on a preset indicator such that the weight is heavier on a position closer to the mobile object.

Therefore, the route generator 110 generates the route information for allowing the autonomous running apparatus 204 to run to the gaze region at the predetermined time earlier than the approach time, based on information such as position information about the obstacle {more specifically, a positional relationship between the autonomous running apparatus 204 and the moving person (the wheelchair user 203), or/and a positional relationship between the autonomous running apparatus 204 and the obstacle}, the approach time calculated by the approach time calculator 107, and the gaze region calculated by the gaze region calculator 109, and records the route information in the autonomous running apparatus database 103.

<Step S411>

A route along which the autonomous running apparatus 204 goes toward the desired position that is preset is generated at step S411. A concrete method for generating a route is equivalent to one described at step S401.

<Step S412> (Corresponding to the Previous Step S8)

A new route generated by the route generator 110 using the above method is recorded from the route generator 110 into the moving route information of the autonomous running apparatus database 103, and thereafter the autonomous running apparatus 204 runs based on information about the new route. When a solution of the route is not found, in a circumstance where the autonomous running apparatus 204 and the wheelchair user 203 approach to each other within the predetermined distance, the running of the autonomous running apparatus 204 may temporarily stop in order to secure the safety of the wheelchair user 203. Thereafter, the running information generating process returns to step S401. When the running information generating process goes from step S402 or step S406 or step S408 to step S412, the autonomous running apparatus 204 runs based on the route information generated during non-detection of the wheelchair user 203.

<Effect>

According to the first embodiment of the present disclosure, even when the moving person in a wheelchair (the wheelchair user 203) is present, the running information generating apparatus 100 can generate running information for making the autonomous running apparatus run in the region where the wheelchair user gazes at an obstacle at his/her feet that is likely to be gazed. Therefore, the wheelchair user is enabled to recognize the presence of the autonomous running apparatus more securely.

Figure 19:
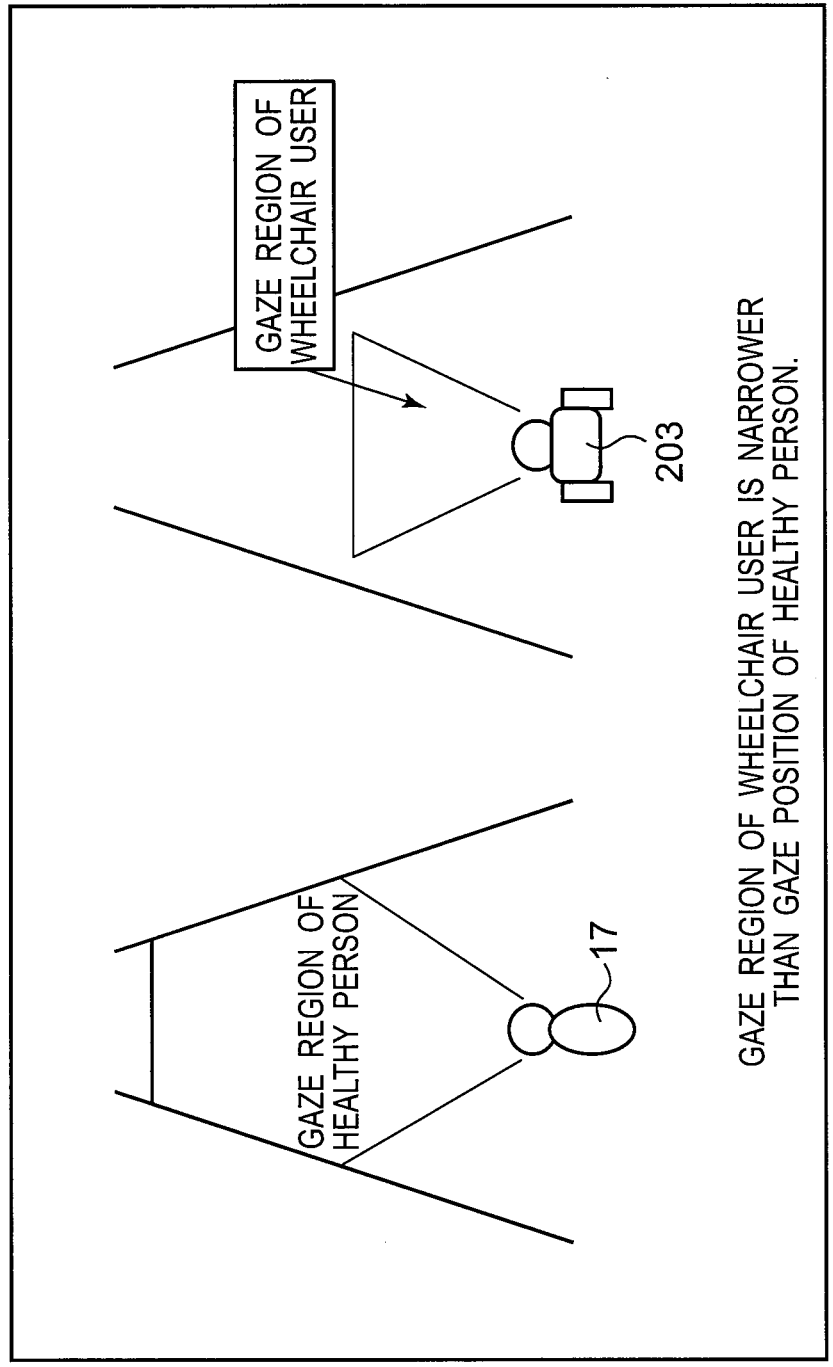
FIG. 19 is an explanatory view illustrating a characteristic of the gaze region of wheelchair user.

Therefore, for example, the first embodiment can be applied also to a case where a robot for automatically carrying a medicine as a specific example of the autonomous running apparatus 204 is introduced into a hospital as one example of a building and a system for making the robot for automatically carrying a medicine autonomously run on a floor where inpatients are present is introduced. On the other hand, in a hospital, since inpatients are afraid of fall, the inpatients pay attention to obstacles at their feet, and thus their visual lines tend to be low. For this reason, the visual fields of the inpatients are frequently narrower than general healthy people. Particularly as described with reference to FIG. 19, a gaze region of a healthy person 17 is wide (see a left of the view in FIG. 19), whereas the gaze region of the wheelchair user 203 is often narrower than the gaze region of the healthy person 17 because the wheelchair user 203 mainly gazes at not a far distance but the vicinity of the feet (see a right part of the view in FIG. 19). In such a circumstance, when a robot that autonomously moves and is the specific example of the autonomous running apparatus 204 moves in a hospital, a route should be designed on the assumption that patients who use wheelchairs are present. In such a case, according to the first embodiment, the autonomous running apparatus 204 runs in a direction of a region on a feet side gazed by the wheelchair user 203, so that the wheelchair user 203 can be made to recognize the presence of the autonomous running apparatus 204 without being surprised at the appearance of the autonomous running apparatus 204. As a result, the wheelchair user 203 can be made to recognize the presence of the autonomous running apparatus 204 more securely, and even when the moving person in a wheelchair (the wheelchair user 203) is present, the wheelchair user 203 can be made to recognize the presence of the autonomous running apparatus 204 more securely.

Second Embodiment

In the running information generating apparatus 100 according to the first embodiment, after the gaze region of the wheelchair user 203 is taken into consideration, a moving direction of the robot in a circumstance where an obstacle is present on a hallway is determined in accordance with the position of the wheelchair user 203. On the other hand, in a running information generating apparatus 100B according to the second embodiment, in short, a diagnosis and treatment department is specified by a tag of a patient, a position of a direction board that is likely to be checked by the patient is specified, and the gaze region is widened by using the position of direction board.

Before characteristics of the running information generating apparatus 100B according to the second embodiment are described, a patient's behavior situation that is predicted in a hospital is described. A patient in a wheelchair who moves in a hospital often comes to the hospital to get medical treatment, and thus the patient often moves while checking bulletin boards. Further, since the patient often moves in the hospital while bringing a registration card or a medical record, implanting of a tag into them enables specification of patient's information about diagnosis and treatment departments such as medical examination, treatment, checkup, operation, functional training, accounting, and reception of medicine (facilities in the hospital such as diagnosis and treatment departments, treatment rooms, clinical laboratories, operating rooms, functional training rooms, pay counter, and pharmacy). In order to simplify the description, a case where the patient visits a diagnosis and treatment department is described, but much the same is true on a case where the patient gets treatment in places other than the diagnosis and treatment department. When the diagnosis and treatment department where the patient visits is specified, bulletin boards gazed by the patient can be specified to a certain extent.

Figure 20:
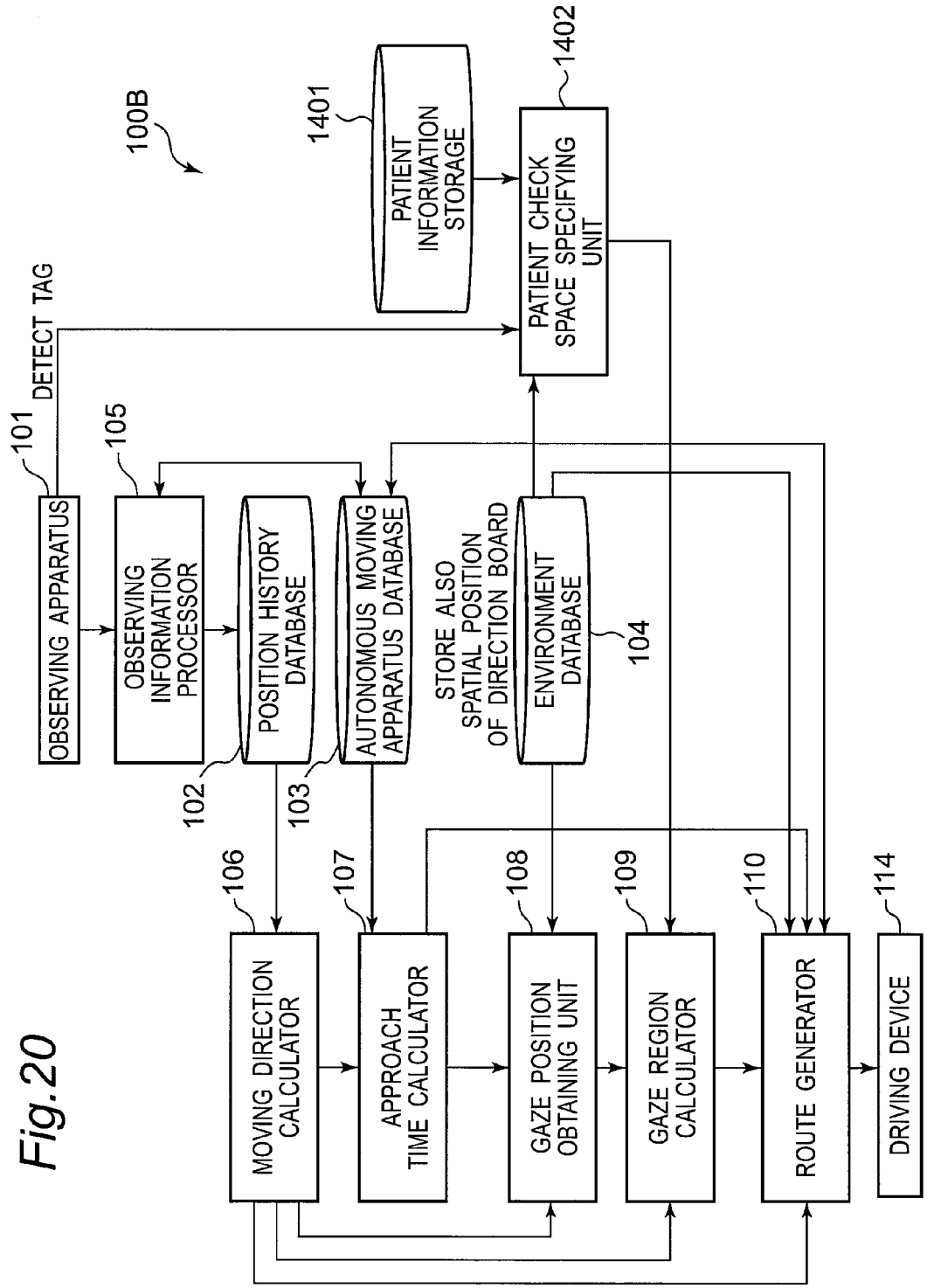
FIG. 20 is a block diagram illustrating a functional constitution of the running information generating apparatus of the autonomous running apparatus according to the second embodiment.

Therefore, in the second embodiment, as shown in FIG. 20, a patient information storage 1401 and a patient check space specifying unit 1402 are further provided to the first embodiment, and the gaze region calculator 109 calculates the gaze region of the wheelchair user 203 from spatial position information about the bulletin boards likely to be checked by the patient specified by the patient check space specifying unit 1402 (for example, posting position), based on information in the patient information storage 1401.

The patient information storage 1401 stores correspondence relationships between patients and tag information owned by the patients.

The patient check space specifying unit 1402 specifies notice information to be checked by the patient, based on tag information observed by the observing apparatus 101, and the correspondence relationships between the tag information and patient information stored in the patient information storage 1401, and further specifies a space to be checked by the patient, from spatial position information of the notice information in the hospital stored in an environment database 104.

The gaze region calculator 109 calculates the gaze region of the wheelchair user 203 based on spatial position information about the bulletin boards likely to be checked by the patient specified by the patient check space specifying unit 1402.

An operation of the running information generating apparatus 100B is simply described below. Basically, a portion that is newly added in order to perform the similar operation to the first embodiment is described.

As shown in FIG. 21, an ID of a patient having a tag, a diagnosis and treatment department where the patient visits, and treatment contents in that diagnosis and treatment department are related to a tag ID and stored in the patient information storage 1401. As to this information, when the tag is provided to the patient in the hospital, correspondence between contents described in the patient's medical record and the tag ID is registered.

The observing apparatus 101 observes the tag ID owned by the patient, and when a predetermined tag ID is detected, the patient check space specifying unit 1402 specifies a diagnosis and treatment department and medical examination contents of the patient having the tag ID.

Figure 22B:
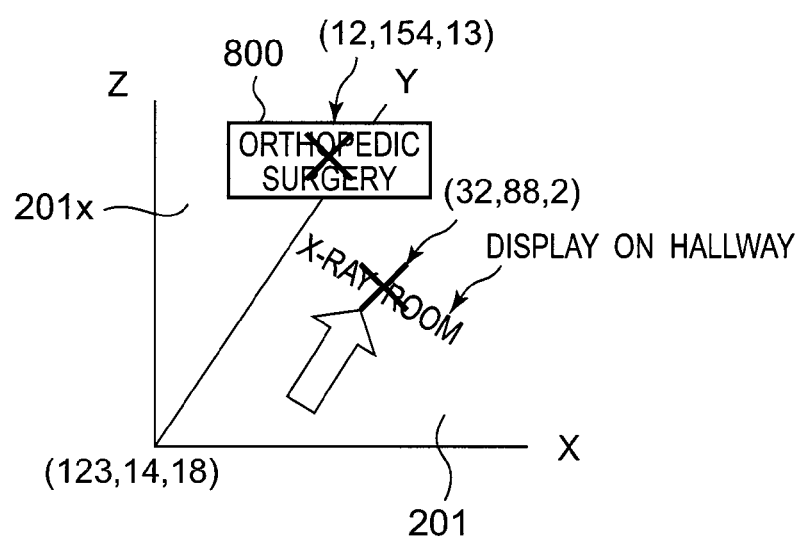
FIG. 22B is a view illustrating one example of the environment database according to the second embodiment.

Further, data contents shown in FIG. 8A to FIG. 8E, and as shown in FIG. 22A and FIG. 22B, information about the gaze point of the patient, specifically, spatial position information about each position on which each bulletin board related to each diagnosis and treatment department is posted in a hospital are stored in the environment database 104. For example, in FIG. 22A and FIG. 22B, orthopedic surgery as the diagnosis and treatment department corresponds to "Orthopedic Surgery" posted on a door or "X-Ray Room" posted in hallway of a hospital. Further, standard positions on respective floors in the entire hospital are stored in the bulletin boards, and representative coordinate positions of the standard positions where the patient make a check are further registered. Further, information about sizes of the bulletin boards is also registered. The gaze region calculator 109 can calculate each place in the hospital where each bulletin board is posted, by using the information. Further, the gaze region calculator 109 can estimate whether a patient who is moving in a wheelchair checks the information on the bulletin board. When the patient checks the bulletin board, the gaze region calculator 109 corrects the gaze region with consideration for the position information about the bulletin board.

Figure 23:
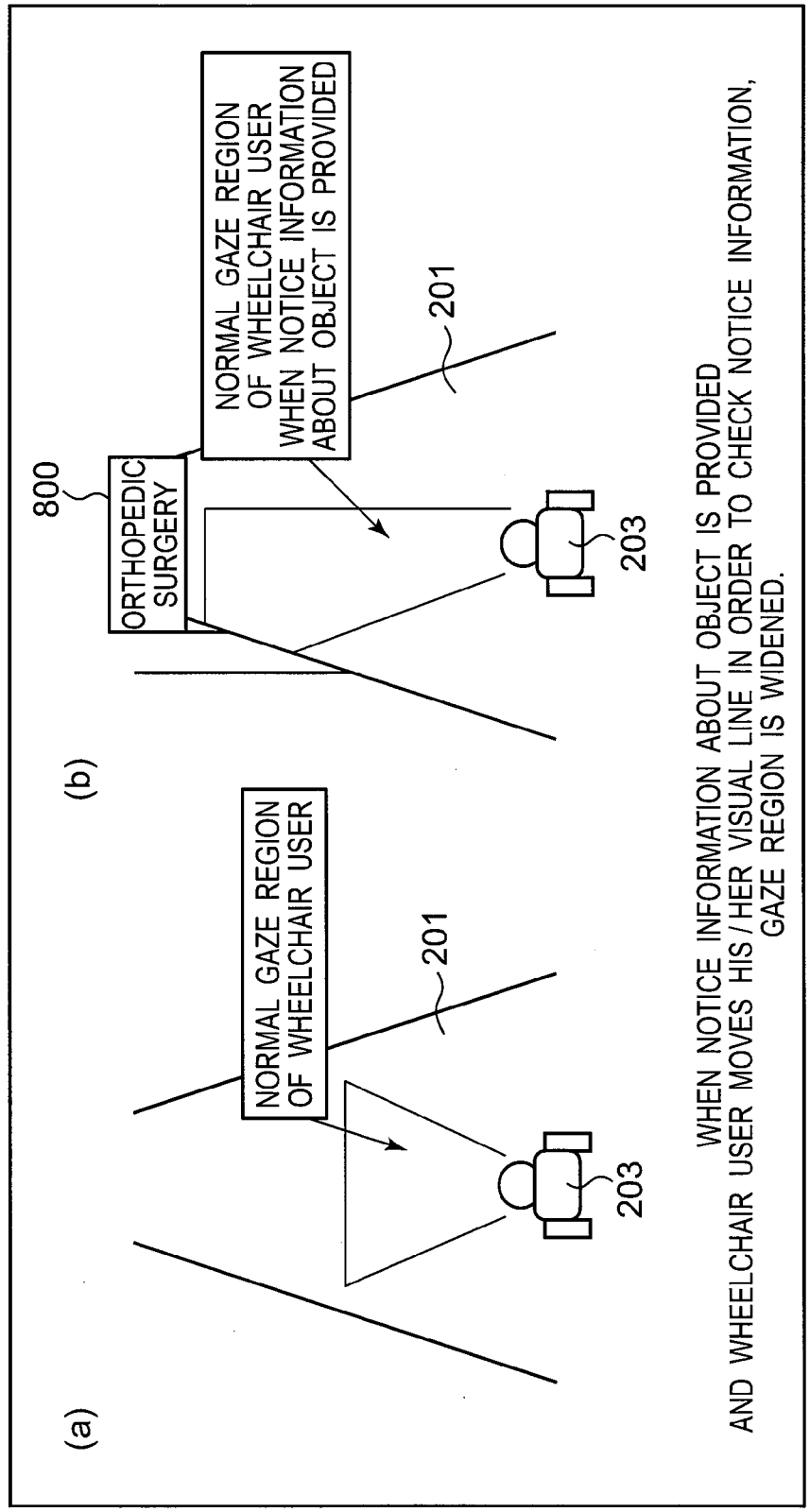
FIG. 23 is an explanatory view illustrating the characteristic of the gaze region of the wheelchair user according to the second embodiment.

As shown in FIG. 23, for example, even in a case where the gaze region of the wheelchair user 203 is set as shown on a left part (a) of FIG. 23, when a specification can be made that the patient in the wheelchair user 203 gets medical treatment of orthopedic surgery from the tag owned by the patient and "Orthopedic Surgery" is posted on a door in the hallway, the patient is likely to move his/her eyes to that direction. Therefore, the gaze region of the wheelchair user 203 is corrected by the gaze region calculator 109 as shown in a right part (b) of FIG. 23.

According to the second embodiment, the gaze region of the wheelchair user 203 can be corrected by the gaze region calculator 109 based on information about diagnosis and treatment departments to which the wheelchair user 203 is likely to go and a position of the direction board, and the gaze region of the wheelchair user 203 can be generated more accurately. Therefore, the autonomous running apparatus 14 is made to run toward the gaze region of the wheelchair user 13 more securely, so that the wheelchair user 13 can be made to recognize the presence of the autonomous running apparatus 14 more securely.

Third Embodiment

In the running information generating apparatus 100 according to the first embodiment, an ability to manipulate the wheelchair of the wheelchair user 203 is uniform. However, a patient as the wheelchair user 203 who uses a wheelchair for a long time can avoid obstacles at a shorter distance with a small turning radius. On the other hand, a beginner in use of a wheelchair (wheelchair beginner) needs a long distance in order to avoid obstacles.

Figure 24:
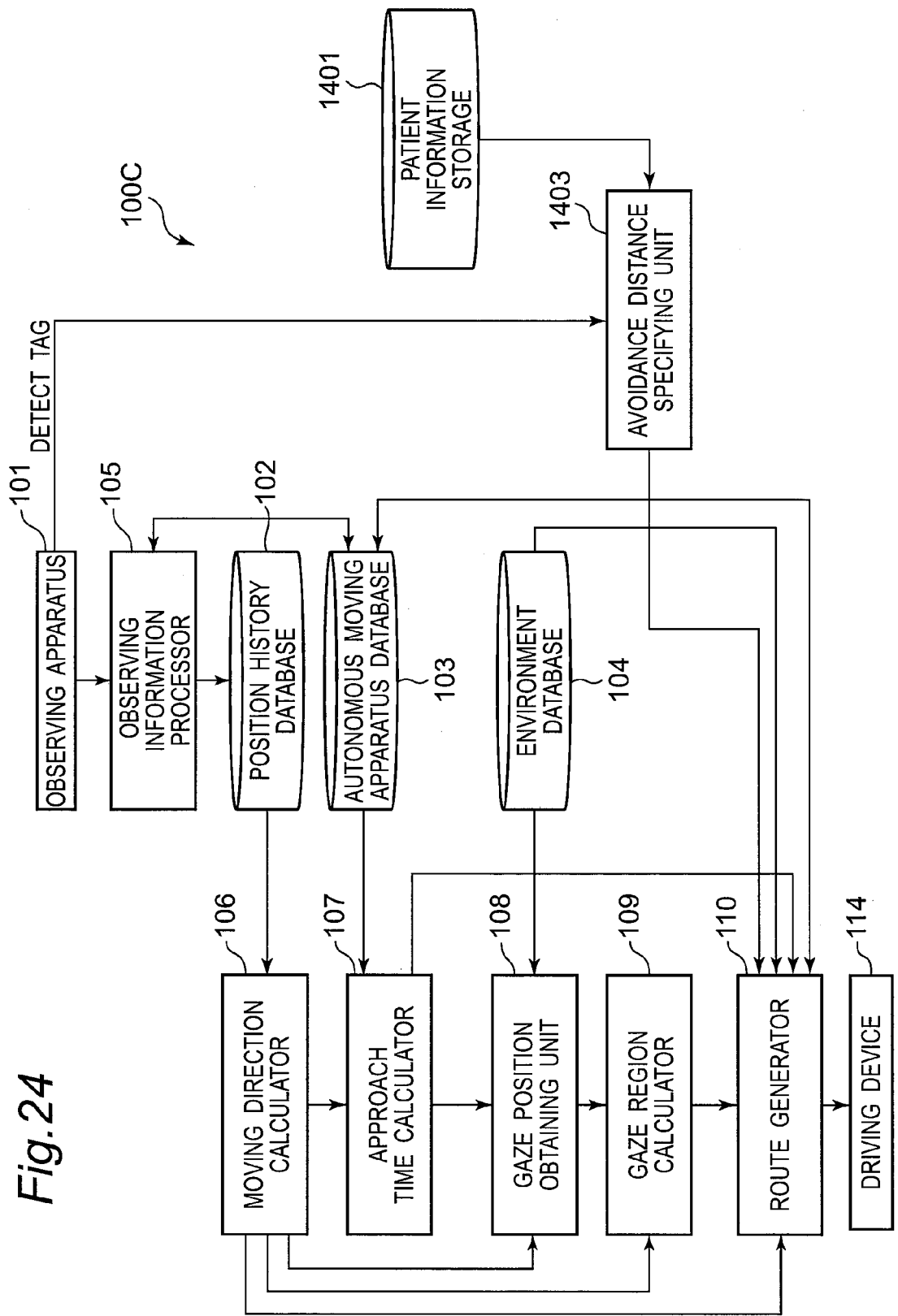
FIG. 24 is a block diagram illustrating a functional constitution of a running information generating apparatus of an autonomous running apparatus according to a third embodiment.

Therefore, in a running information generating apparatus 100C according to the third embodiment shown in FIG. 24, characteristics relating to a movement history of a patient's wheelchair is specified by a tag, an accustomed level or a performance of the wheelchair (avoiding characteristic or the like) is specified, so that an easily avoidable distance can be specified.

That is to say, the running information generating apparatus 100C further includes a patient information storage 1401 and an avoidance distance specifying unit 1403.

The patient information storage 1401 stores the use history of the wheelchair used by the wheelchair user 203 or information about types of wheelchairs in advance.

The avoidance distance specifying unit 1403 specifies a distance where the wheelchair user 203 can easily avoid obstacles using the information about the wheelchair used by the patient specified by the patient information storage 1401.

Further, the route generator 110 generates an avoiding route of an autonomous running apparatus 204 using the distance specified by the avoidance distance specifying unit 1403.

An operation of the running information generating apparatus 100C is simply described below. Basically, a portion that is newly added to the first embodiment in order to perform the similar operation to the first embodiment is described.

The patient information storage 1401 further stores a use history of a wheelchair for a patient ID and information about a type of the wheelchair as shown in FIG. 25. When the autonomous running apparatus 204 approaches, the distance for easily avoiding the autonomous running apparatus 204 varies with a period of the use history of the wheelchair of the wheelchair user, and the wheelchair user 203 who uses the wheelchair for a long period is accustomed with a manipulation of the wheelchair.

Figure 26:
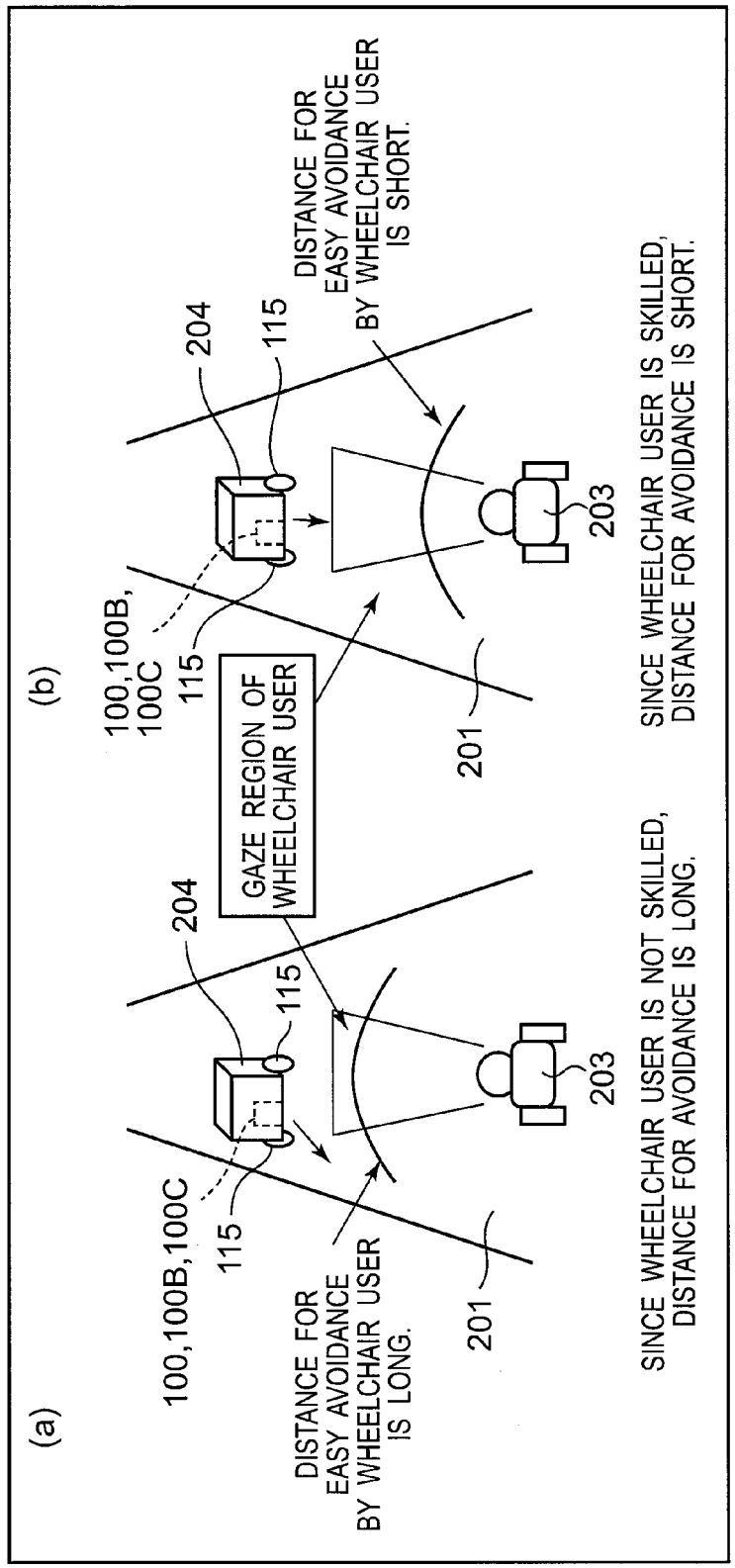
FIG. 26 is an explanatory view illustrating one example of a change in a running route of the autonomous running apparatus corresponding to a size of the gaze region according to the third embodiment.

As show in a right part (b) of FIG. 26, therefore, when the wheelchair user 203 is skilled and thus the distance for easy avoidance is short, the autonomous running apparatus 204 enters the gaze region of the wheelchair user 203, and selects a route that makes the wheelchair user 203 to recognize the presence of a mobile object. On the other hand, as shown on a left part (a) of FIG. 26, the distance for avoidance is longer for a patient who is not skilled in the manipulation of the wheelchair, and when the mobile object enters the gaze region, the wheelchair user 203 should immediately take an avoidance behavior. In such a case, therefore, the autonomous running apparatus 204 selects a route to avoid the gaze region. In the description using the A* algorithm described in the first embodiment, in a case of an unskilled wheelchair patient (wheelchair beginner), a large weight is put on an arc entering the gaze region. As a result, the autonomous running apparatus 204 takes a behavior to avoid the wheelchair patient with a long distance or stop until the wheelchair patient passes by even if the running distance greatly increases.

According to the third embodiment, characteristic relating to the history of the wheelchair of the wheelchair user 203 is specified by a tag, and a skill level or a performance of a wheelchair is specified, so that a distance for easy avoidance can be specified. Therefore, the route generator 110 can generate a more suitable avoiding route of the autonomous running apparatus 204 based on the skill level of the wheelchair of the wheelchair user 203. As a result, the autonomous running apparatus 204 can be made to run toward the gaze region of the wheelchair user 203, and the wheelchair user 203 can be made to recognize the presence of the autonomous running apparatus 204 more securely.

Though the present disclosure has been described above based on the above first to third embodiments, the present disclosure should not be limited to the above-described first to third embodiments. For example, the present disclosure also includes the following cases.

Part or entirety of each of the above-described running information generating apparatuses is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiments is a following program. That is to say, this program has a computer execute the sections (parts/units) defined in claims. The program has a computer execute the units/steps defined in claims. That is, such a program is a program for generating running information of an autonomous running apparatus: causing a computer to function as:

a position obtaining unit that obtains a position of a moving person in a building with the position being related to every predetermined time or an amount of time;

a moving person identifying unit that identifies a type of the moving person obtained from the position obtaining unit;

a position history database that records, in chronological order, the position and the type of the moving person obtained by the position obtaining unit and the moving person identifying unit, respectively;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;

an environment database that records a position of a still object present in the building together with information about the moving person who tends to gaze at the still object;

a gaze position obtaining unit that obtains a gaze position of the moving person based on the position and the type of the moving person, the moving direction of the moving person, and the position of the still object;

a gaze region calculator that calculates a gaze region of the moving person based on the position and the type of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the still object, the approach time, and the gaze region.

Alternatively, the program is a program for generating running information of an autonomous running apparatus: causing a computer to function as:

a position history database that records positions of a moving person in a wheelchair in a building obtained by a position obtaining unit in chronological order, the position obtaining unit obtaining the positions of the moving person each predetermined time;

a movement information calculator that calculates a moving direction and a moving speed of the moving person from information in the position history database;

an autonomous running apparatus database that records running information for making the autonomous running apparatus that runs along a predetermined route in the building run from a first position to a second position;

an approach time calculator that calculates an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;

an obstacle database that records position of an obstacle;

a gaze position obtaining unit that obtains a gaze position of the moving person based on the position of the moving person, the moving direction of the moving person, and the position of the obstacle in the obstacle database;

a gaze region calculator that calculates a gaze region of the moving person based on the position of the moving person, the moving direction of the moving person, and the gaze position, and a running information generator that generates running information for making the autonomous running apparatus run into the gaze region calculated by the gaze region calculator at a predetermined time earlier than the approach time calculated by the approach time calculator based on the position of the obstacle, the approach time, and the gaze region.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

Figure 27:
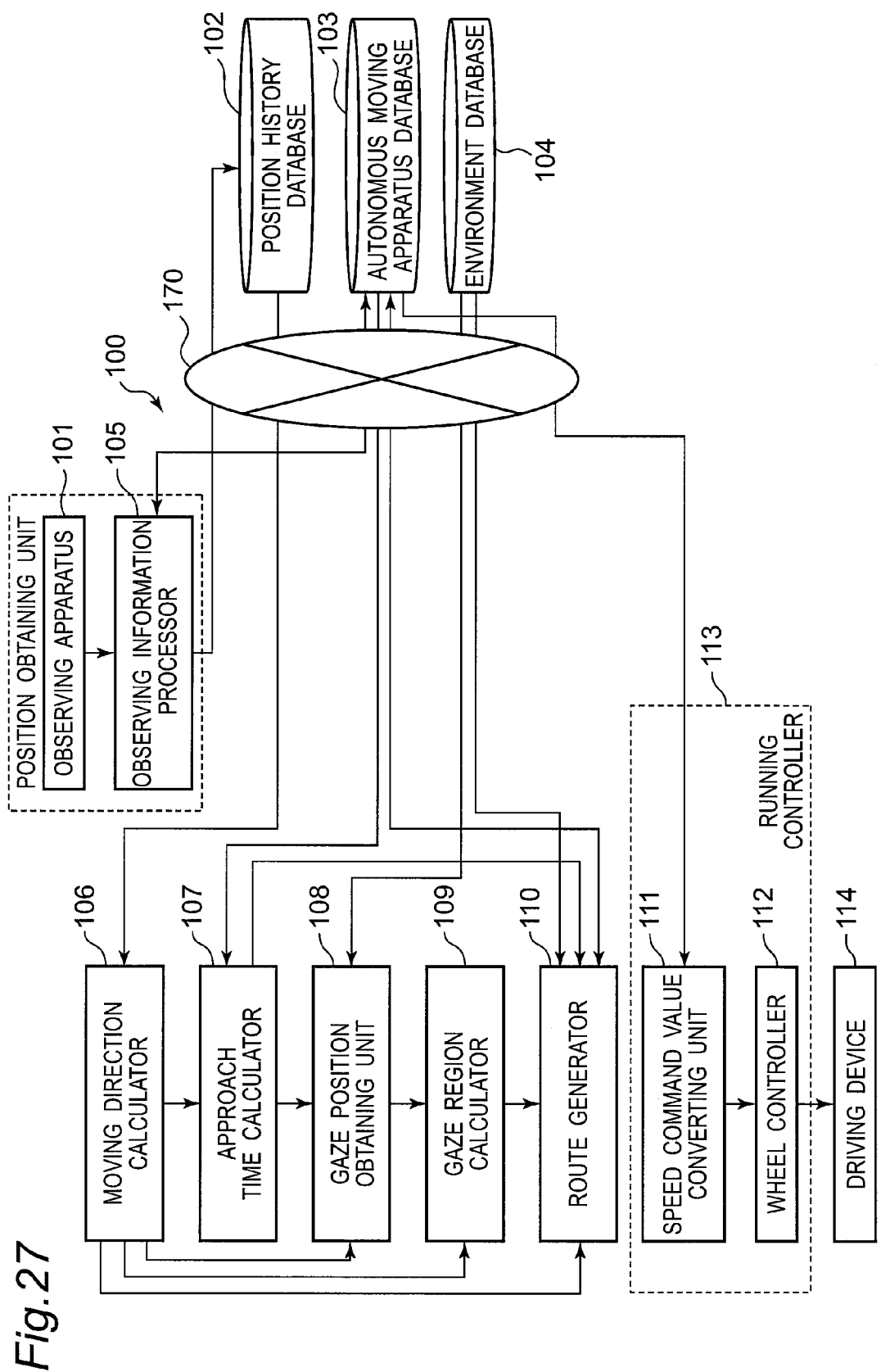
FIG. 27 is a block diagram illustrating a functional constitution of the running information generating apparatus of the autonomous running apparatus according to a modified example of the first embodiment.

Further, instead of the respective databases that are provided as the components in the running information generating apparatus, as illustrated in a modified example of the first embodiment in FIG. 27, no database is present in the running information generating apparatus, and the running information generating apparatus may input/output information into/from databases on the outside via a communication line 170 if necessary. This is not limited to the first embodiment, and may be applied also to the other embodiments.

By properly combining the arbitrary embodiment(s) or modification(s) of the aforementioned various embodiments and modifications, the effects possessed by the embodiment(s) or modification(s) can be produced.

The running information generating apparatus of the autonomous running apparatus of the present disclosure, the autonomous running apparatus, the running information generating method of the autonomous running apparatus, and the running information generating program of the autonomous running apparatus can make the moving person (a wheelchair user or a pedestrian) to recognize the presence of the autonomous running apparatus more securely, and are generally useful as a running information generating apparatus of an autonomous running apparatus, the autonomous running apparatus, a running information generating method of the autonomous running apparatus, and a running information generating program of the autonomous running apparatus in a case where the autonomous running apparatus autonomously runs in hospitals, nursing homes for the aged, public welfare facilities, shopping malls, or airports where a lot of a vehicle manipulator such as wheelchair users generally come and go.

The entire disclosure of Japanese Patent Application No. 2012-243498 filed on Nov. 5, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A running information generating apparatus of an autonomous running apparatus comprising:

a position obtaining unit that obtains a position of a moving person in a building with the position being related to every predetermined time or an amount of time;

a moving person identifying unit that identifies a type of the moving person obtained from the position obtaining unit;

a position history database that records, in chronological order, the position and the type of the moving person obtained by the position obtaining unit and the moving person identifying unit, respectively;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;

an environment database that records a position of a still object present in the building together with information about the moving person who tends to gaze at the still object;

a gaze position obtaining unit that obtains a gaze position of the moving person based on the position and the type of the moving person, the moving direction of the moving person, and the position of the still object;

a gaze region calculator that calculates a gaze region of the moving person based on the position and the type of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the still object, the approach time, and the gaze region.

2. A running information generating apparatus of an autonomous running apparatus comprising:

a position obtaining unit that obtains a position of a moving person in a wheelchair in a building with the position being related to every predetermined time or amount of time;

a position history database that records the position of the moving person obtained by the position obtaining unit in chronological order;

a movement information calculator that calculates a moving direction and a moving speed of the moving person from information in the position history database;

an autonomous running apparatus database that records running information for making the autonomous running apparatus that runs along a route preset in the building run from a first position to a second position;

an approach time calculator that calculates an approach time at which the autonomous running apparatus and the moving person approach to each other within a predetermined distance, from the position of the moving person obtained by the position obtaining unit, the moving direction and the moving speed of the moving person calculated by the movement information calculator, and the running information recorded in the autonomous running apparatus database;

an obstacle database that records a position of an obstacle in the building;

a gaze position obtaining unit that obtains a gaze position of the moving person based on the position of the moving person, the moving direction of the moving person, and the position of the obstacle;

a gaze region calculator that calculates a gaze region of the moving person based on the position of the moving person, the moving direction of the moving person, and the gaze position; and a running information generator that generates the running information for making the autonomous running apparatus run into the gaze region calculated by the gaze region calculator at a predetermined time earlier than the approach time calculated by the approach time calculator based on the position of the obstacle, the approach time, and the gaze region.

3. The running information generating apparatus of the autonomous running apparatus according to claim 2, wherein
the gaze position obtaining unit obtains the gaze position of the moving person based on the position of the moving person, the moving direction and the moving speed of the moving person, and the position of the obstacle,
the gaze region calculator calculates the gaze region of the moving person based on the position of the moving person, the moving direction and the moving speed of the moving person, and the gaze position.

4. The running information generating apparatus of the autonomous running apparatus according to claim 2, wherein the gaze region calculator calculates the gaze region referring to also a height of the moving person.

5. The running information generating apparatus of the autonomous running apparatus according to claim 4, wherein the height of the moving person is estimated based on any one of height information, age information, and sitting height information recorded in an ID tag owned by the moving person.

6. The running information generating apparatus of the autonomous running apparatus according to claim 1, wherein the running information generator generates the running information for making the autonomous running apparatus run into the gaze region calculated by the gaze region calculator at the predetermined time earlier than the approach time calculated by the approach time calculator, based on a positional relationship between the autonomous running apparatus and the moving person or/and a positional relationship between the autonomous running apparatus and the obstacle.

7. The running information generating apparatus of the autonomous running apparatus according to claim 2, wherein the running information generator generates the running information for making the autonomous running apparatus run into the gaze region calculated by the gaze region calculator at the predetermined time earlier than the approach time calculated by the approach time calculator, based on a positional relationship between the autonomous running apparatus and the moving person or/and a positional relationship between the autonomous running apparatus and the obstacle.

8. The running information generating apparatus of the autonomous running apparatus according to claim 1, wherein the running information generated by the running information generator is recorded in the autonomous running apparatus database.

9. The running information generating apparatus of the autonomous running apparatus according to claim 2, wherein the running information generated by the running information generator is recorded in the autonomous running apparatus database.

10. The running information generating apparatus of the autonomous running apparatus according to claim 1, wherein
when the building is a hospital and the moving person is a patient, the patient has an identifier for identifying the patient in the hospital, the running information generating apparatus further comprises:
a patient information storage that stores information about diagnosis and treatment departments where the patient visits in the hospital in the identifier,
notice information about the diagnosis and treatment departments stored in the patient information storage, and information about a posting position of the notice information in the hospital being stored in the environment database,
the position obtaining unit detecting information of the identifier which the moving person has; and
a patient check space specifying unit that specifies a posting position of information checked by the moving person based on the information about the diagnosis and treatment departments of the patient corresponding to the identifier detected by the position obtaining unit and the posting position of the notice information in the hospital, the notice information relating to the diagnosis and treatment departments and being stored in the environment database,
the gaze region calculator calculating a gaze region gazed by the moving person, using the posting position of the information specified by the patient check space specifying unit.

11. The running information generating apparatus of the autonomous running apparatus according to claim 2, wherein
when the building is a hospital and the moving person is a patient, the patient has an identifier for identifying the patient in the hospital, the running information generating apparatus further comprises:
a patient information storage that stores information about diagnosis and treatment departments where the patient visits in the hospital in the identifier,
notice information about the diagnosis and treatment departments stored in the patient information storage, and information about a posting position of the notice information in the hospital being stored in the environment database, the position obtaining unit detecting information of the identifier which the moving person has; and a patient check space specifying unit that specifies a posting position of information checked by the moving person based on the information about the diagnosis and treatment departments of the patient corresponding to the identifier detected by the position obtaining unit and the posting position of the notice information in the hospital, the notice information relating to the diagnosis and treatment departments and being stored in the environment database, the gaze region calculator calculating a gaze region gazed by the moving person, using the posting position of the information specified by the patient check space specifying unit.

12. The running information generating apparatus of the autonomous running apparatus according to claim 10, wherein
the identifier is an identifier for specifying a diagnosis and treatment department where the moving person visits,
the information about the posting position of the notice information about the diagnosis and treatment department for the moving person on a passage in the hospital are stored in the environment database,
the gaze region calculator widens the gaze region of the moving person based on information about a space position in the notice information checked by the moving person.

13. The running information generating apparatus of the autonomous running apparatus according to claim 1, wherein when a plurality of the gaze positions are present, the gaze region calculator sets segments or regions that make connection between the plurality of gaze positions, as the gaze position.

14. The running information generating apparatus of the autonomous running apparatus according to claim 2, wherein when a plurality of the gaze positions are present, the gaze region calculator sets segments or regions that make connection between the plurality of gaze positions, as the gaze position.

15. The running information generating apparatus of the autonomous running apparatus according to claim 1, wherein
when the building is a hospital and the moving person is a patient, the patient has an identifier for identifying the patient in the hospital, the running information generating apparatus further comprises:
a patient information storage that stores, in the identifier, information about a wheelchair used by the patient in the hospital,
the position obtaining unit detecting information about the identifier which the moving person has; and
an avoidance distance specifying unit that specifies an avoidance distance of the moving person with respect to the obstacle from the information about the wheelchair of the patient corresponding to the identifier detected by the position obtaining unit,
the running information generator generating the running information based on the gaze region calculated by the gaze region calculator, and the avoidance distance specified by the avoidance distance specifying unit.

16. The running information generating apparatus of the autonomous running apparatus according to claim 15, wherein in the patient information storage, as the patient uses the wheelchair for a long time, the avoidance distance in the avoidance distance specifying unit is shorter.

17. An autonomous running apparatus comprising:
the running information generating apparatus of the autonomous running apparatus described in claim 1;
a running information obtaining unit that obtains the running information recorded in the autonomous running apparatus database; and
a driving device controller that controls running based on the running information obtained by the running information obtaining unit.

18. A running information generating method of an autonomous running apparatus comprising:
obtaining, by a position obtaining unit, a position of a moving person in a building with the position being related to every predetermined time or amount of time;
identifying, by a moving person identifying unit, a type of the moving person obtained from the position obtaining unit;
recording the position and the type of the moving person obtained by the position obtaining unit and the moving person identifying unit, in a position history database in chronological order;
calculating, by a movement information calculator, a moving direction and a moving speed of the moving person from information in the position history database;
recording, in an autonomous running apparatus database, running information for making the autonomous running apparatus that runs along a route preset in the building run from a first position to a second position;
calculating, by an approach time calculator, an approach time at which the autonomous running apparatus and the moving person approach to each other within a predetermined distance from the position of the moving person obtained by the position obtaining unit, the moving direction and the moving speed of the moving person calculated by the movement information calculator, and the running information recorded in the autonomous running apparatus database;
recording, in an environment database, a position of a still object present in the building together with information about the moving person who tends to gaze at the still object;
obtaining, by a gaze position obtaining unit, a gaze position of the moving person based on the position and the type of the moving person, the moving direction of the moving person, and a position of the still object;
calculating, by a gaze region calculator, a gaze region of the moving person based on the position and the type of the moving person, the moving direction of the moving person, and the gaze position; and
generating, by a running information generator, the running information for making the autonomous running apparatus run into the gaze region calculated by the gaze region calculator at a predetermined time earlier than the approach time calculated by the approach time calculator based on the position of the still object, the approach time, and the gaze region.

19. A computer-readable recording medium including a running information generating program for making a computer execute the running information generating method of claim 18.

* * * * *